US006957190B1

(12) United States Patent
Sakayori et al.

(10) Patent No.: US 6,957,190 B1
(45) Date of Patent: Oct. 18, 2005

(54) PARTS MANAGEMENT INFORMATION SYSTEM AND PARTS MANAGEMENT METHOD, AND STORAGE MEDIUM

(75) Inventors: Masahiko Sakayori, Toride (JP); Naoki Otsuji, Ryugasaki (JP); Yutaka Inaba, Ibaraki-ken (JP); Koji Kanaya, Tokyo (JP); Fujio Someya, Mitsukaido (JP); Jotaro Takahashi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/156,311

(22) Filed: Sep. 17, 1998

(30) Foreign Application Priority Data

| Sep. 24, 1997 | (JP) | ................................... 9-258991 |
| Sep. 24, 1997 | (JP) | ................................... 9-258992 |
| Sep. 24, 1997 | (JP) | ................................... 9-258993 |

(51) Int. Cl.[7] ............................................ G06F 17/60
(52) U.S. Cl. ........................... 705/16; 705/10; 705/26; 705/64; 375/240; 707/13
(58) Field of Search ............................... 700/216, 134, 700/161, 163; 705/5, 28, 16, 26; 707/104

(56) References Cited

U.S. PATENT DOCUMENTS

| 4,254,329 | A | * | 3/1981 | Gokey et al. ............... 235/349 |
| 5,204,821 | A | * | 4/1993 | Inui et al. ............... 364/468.13 |
| 5,297,031 | A | * | 3/1994 | Gutterman et al. .......... 364/408 |
| 5,548,753 | A | * | 8/1996 | Linstead et al. ............. 395/600 |
| 5,608,621 | A | * | 3/1997 | Caveney et al. ............... 705/10 |
| 5,657,460 | A | | 8/1997 | Egan et al. |
| 5,720,157 | A | * | 2/1998 | Ross ............................. 53/445 |
| 5,799,289 | A | * | 8/1998 | Fukushima et al. .......... 705/400 |
| 5,870,717 | A | * | 2/1999 | Wiecha ......................... 705/26 |

(Continued)

FOREIGN PATENT DOCUMENTS

| EP | 0 927 945 | * | 7/1999 | ........... G06F 17/60 |
| JP | A 05073107 A | | 3/1993 | |
| JP | A 050135062 A | | 6/1993 | |
| JP | A 06019924 A | | 1/1994 | |
| JP | A 07021268 A | | 1/1995 | |
| JP | A 09026998 A | | 1/1997 | |

OTHER PUBLICATIONS

Hitachi Groupmax Integrated Desktop Version 2.0 User's Guide 5th Edition, Hitachi Co. Ltd., p. 4, pp58-61 and p114. (see Our Comments attached to reference for date).

*Primary Examiner*—Firmin Backer
(74) *Attorney, Agent, or Firm*—Cowan Liebowitz & Latman P.C.; John J Torrente

(57) ABSTRACT

Since icons for identifying the contents of orders received or orders placed and the numbers of data representing the processing a status of the orders received or orders placed are displayed in combination to manage orders received and orders placed for parts, the processing status such as orders expected to be received, determination of orders, delay in scheduling, acceptance, and the like in the shop can be visually and quickly checked. Detailed information associated with the orders expected to be received, determination of orders, delay in scheduling, and the like is visually presented as a graph and table which correspond to the parts management items identified by icons. Progress in order received/placed processing can be reviewed on day-to-day basis, and comparison of a plurality of managed items can be made, thus realizing versatile parts management. The parts management by means of a display using common icons for identifying the management units of orders received and orders placed can easily determine the correspondence between the processing a status of the overall shop and detailed information in units of parts, thus allowing easy and accurate order received/placed management.

3 Claims, 29 Drawing Sheets

U.S. PATENT DOCUMENTS 5,914,878 A * 6/1999 Yamamoto et al. .... 364/468.13
5,983,202 A * 11/1999 Yabe et al.
6,012,041 A * 1/2000 Brewer et al. ................ 705/28
6,321,231 B1 * 11/2001 Jebens et al. ............. 707/104.1
6,324,522 B2 * 11/2001 Peterson et al. ............... 705/28
2001/0002204 A1 * 5/2001 Jebens et al. .......... 375/240.01

* cited by examiner

FIG. 7

| PARTS NAME | MODEL NUMBER | ORDERED DATE | QUANTITY | FINAL DELIVERY DATE | DATE OF COMPLETION |
|---|---|---|---|---|---|
| A | type-a | 97.7.20 | 10 | 97.7.31 | 97.7.31 |
| B | type-b | 97.7.10 | 15 | 97.7.18 | 97.7.23 |
| C | type-c | 97.7.15 | 18 | 97.7.29 | |
| D | type-e | 97.7.13 | 20 | 97.7.23 | 97.7.23 |
| E | type-f | 97.7.14 | 24 | 97.8.04 | |
| F | type-g | 97.7.15 | 30 | 97.7.25 | 97.7.24 |
| G | type-h | 97.7.23 | 40 | 97.7.24 | 97.7.24 |

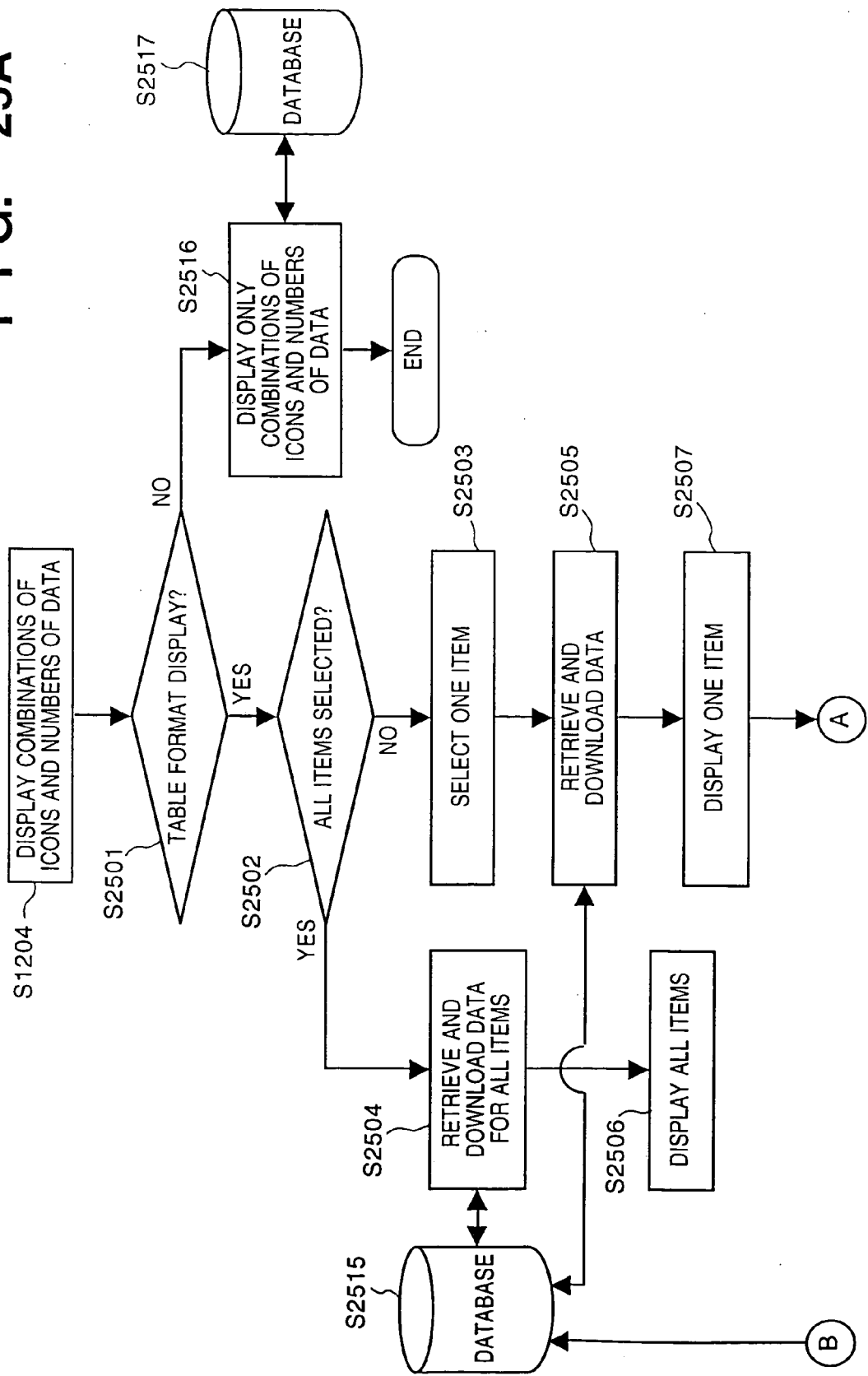

PARTS MANAGEMENT INFORMATION SYSTEM AND PARTS MANAGEMENT METHOD, AND STORAGE MEDIUM

BACKGROUND OF THE INVENTION

The present invention relates to a parts management. FIG. 6 shows a conventional parts management information system. Managing terminals 133-1, 133-2, and 133-3, and storage means (databases) 132-1, 132-2, 132-3, and 132-4 are connected to a central processing unit (CPU) 131.

The databases of parts used are hierarchically managed in units of managed items: for example, the parts master 132-1, inventory master 132-2, unit-price master 132-3, and schedule master 132-4.

The terminals 133-1, 133-2, and 133-3 are used to refer to or update data on the databases 132-1, 132-2, 132-3, and 132-4. For example, when parts in stock are referred to, the operator refers to the inventory master 132-2 from one of the terminals 133-1, 133-2, and 133-3. As the number of parts to be dealt with becomes larger, the number of orders on the database increases cumulatively.

FIG. 7 shows a display example of the spreadsheet format. The operator searches the displayed contents for a part used, and compares the dates of "final delivery date" and "date of completion (acceptance)" to check if there is any delay. If the date of completion is blank, this means that the part is not yet complete, and the operator determines that the part is still in a shop in an intermediate process.

Since the display in the spreadsheet format is a set of data based on given key information, the operator often cannot directly and quickly confirm the status, such as expected orders in his or her shop (the number of expected orders), delay (the number of parts that have not yet been accepted), order determination (the number of jobs which are in progress after their specifications have been determined), acceptance (the number of accepted orders), and the like.

More specifically, in order to obtain conclusions (the number of complete parts, delivery on the delivery date or not, and so forth) required for shop management, data must be interpreted manually. In the above example, the operator or shop manager must compare the "final delivery date" and "date of completion".

The aforementioned conventional parts management information system suffers the following problems.

1. It is hard to inform the operator or shop manager of an abnormal condition such as a delay in scheduling, in real time.

2. In order to selectively search for required information while classifying parts used in the primary shop and those used in other shops, the operator must find out required data from a list.

3. Orders received by the primary shop and those placed with other shops are not easy to manage and confirm from the data in the spreadsheet format.

4. Parts management that displays data in table format displays data based on key information, and limits versatile analysis that requires order placement/receipt processing status of shops in units of days and comparison of a plurality of data. In order to compensate for such limitations, the operator must perform manual analyzes based on the data displayed.

However, in such analysis, as the shop becomes larger, the number of orders to be processed becomes huge, and it is hard to inform the operator or shop manager of abnormal conditions such as a delay in scheduling and the like at desired times. Hence, in practice, such display is not effective for operation of shops.

5. A conventional parts management information system provides a uniform data display based on a specific condition, and must use a plurality of applications to confirm the total status and detailed status by search in order to perform receipt/placement processing of shops. In such a case, a search must be made while confirming integrity of data, and the works required for parts management become troublesome. As the shop becomes larger and the number of orders to be processed become huge, it is difficult to relate the overall processing status in detailed information by a conventional uniform display.

SUMMARY OF THE INVENTION

The contents of the present invention will be presented as a plurality of claims. The individual claims are made to solve at least one of the above-mentioned problems, and have the following arrangements.

A parts management information system for managing, by a primary shop, orders received from a first shop, and orders placed with a second shop, comprises first display control means for displaying on display means a combination of an icon for identifying the order received or order placed, and data indicating a status of the order received or order placed represented by the icon.

A parts management information system for managing an order for parts placed from a first shop with a second shop, comprises first display control means for displaying on display means combinations of icons for identifying items for managing the order placed, and data indicating results of the order placed corresponding to the icons.

A parts management information system for managing an order for parts of a second shop received from a first shop, comprises first display control means for displaying on display means combinations of icons for identifying items for managing the order received, and data indicating results of the order received corresponding to the icons.

A parts management information system for managing an order received or order placed for parts, comprises data exchange means for exchanging data representing a status of the order received or order placed between a plurality of computers, and display means for displaying a combination of the exchanged data representing the status of the order received or order placed, and an icon for identifying the order received or order placed.

A parts management method for managing an order of received from a first shop, and an order placed with a second shop, comprises the first display control step of displaying on display means a combination of an icon for identifying the order received or order placed, and data indicating a status of the order received or order placed represented by the icon.

A parts management method for managing an order received or order placed for parts, comprises the data exchange step of exchanging data representing a status of the order received or order placed between a plurality of computers, and the first display control step of displaying on display means a combination of the exchanged data representing the result of the order received or order placed, and an icon for identifying the order received or order placed.

A computer readable storage medium stores programs for implementing first display control means for displaying on display means a combination of an icon for identifying an order received or order placed, and data indicating a status of the order received or order placed represented by the icon.

A parts management information system for managing an order received or order placed for parts, comprises first display control means for displaying managed items for identifying the order received or order placed on display means, reading means for reading data representing results of the order received or order placed corresponding to the managed items from storage means, and second display control means for displaying a relationship between the managed items and the data read by the reading means on the display means a graph.

A parts management information system for managing an order received or order placed for parts, comprises data exchange means for exchanging data representing a status of the order received or order placed between a plurality of computers, and display means for displaying a combination display of the exchanged data representing the result of the order received or order placed, and an icon for identifying the order received or order placed, and a graph display of the data.

A parts management method for managing an order received or order placed for parts, comprises the first display control step of displaying managed items for identifying the order received or order placed on display means, the reading step of reading data representing results of the order received or order placed corresponding to the managed items from storage means, and the second display control step of displaying a relationship between the managed items and the data read in the reading step on the display means as a graph.

A parts management method for managing an order received or order placed for parts, comprises the data exchange step of exchanging data representing a status of the order received or order placed between a plurality of computers, and the first and second display control steps of displaying on display means a combination display of the exchanged data representing the result of the order received or order placed, and an icon for identifying the order received or order placed, and a graph display of the data.

A computer readable storage medium stores programs for implementing first display control means for displaying managed items for identifying an order received or order placed on display means, reading means for reading data representing results of the order received or order placed corresponding to the managed items from storage means, and second display control means for displaying a relationship between the managed items and the data read by the reading means on the display means as a graph.

A parts management information system for managing an order received or order placed for parts, comprises first display control means for displaying managed items for identifying an order received or order placed on display means, first reading means for reading data representing results of the order received or order placed corresponding to the managed items from storage means, second display control means for displaying order received/placed information of an item selected from the managed items on the display means in a table format, additional selection means for additionally selecting the selected item, and second reading means for reading order received/placed information of the selected for the table format display from the storage means.

A parts management information system for managing an order received or order placed for parts, comprises data exchange means for exchanging data representing a status of the order received or order placed between a plurality of computers, and display means for displaying a combination display of the number of orders representing the exchanged result of the order received or order placed, and an icon for identifying the order received and order placed, and a table format display representing contents of the number of orders.

A parts management method for managing an order received or order placed for parts, comprises the first display control step of displaying managed items for identifying an order received or order placed on display means, the first reading step of reading data representing results of the order received or order placed corresponding to the managed items from storage means, the second display control step of displaying order received/placed information of an item selected from the managed items on the display means in a table format, the additional selection step of additionally selecting the selected item, and the second reading step of reading order received/placed information of the selected for the table format display from the storage means.

A parts management method for managing an order received or order placed for parts, comprises the data exchange step of exchanging data representing a status of the order received or order placed between a plurality of computers, and the first and second display control steps of displaying on display means a combination display of the number of orders representing the exchanged result of the order received or order placed, and an icon for identifying the order received and order placed, and a table format display representing contents of the number of orders.

A computer readable storage medium stores programs for implementing first display control means for displaying managed items for identifying an order received or order placed on display means, first reading means for reading data representing results of the order received or order placed corresponding to the managed items from storage means, second display control means for displaying order received/placed information of an item selected from the managed items on the display means in a table format, additional selection means for additionally selecting the selected item, and second reading means for reading order received/placed information of the selected for the table format display from the storage means.

A parts management method for managing an order for parts placed from a first shop with a second shop, comprises the first display control step of displaying on display means combinations of icons for identifying items for managing the order placed, and data indicating results of the order placed corresponding to the icons.

A parts management method for managing an order for parts of a second shop received from a first shop, comprises the first display control step of displaying on display means combinations of icons for identifying items for managing the order received, and data indicating the statuses of the order received corresponding to the icons.

A parts management information system for managing an order received or order placed for parts, comprises data exchange means for exchanging data representing a status of the order received or order placed between a plurality of computers, first display control means for combining data representing the exchanged status of the order received or order placed, and an icon for identifying the order received or order placed, display means for displaying the combination result, second display control means for displaying the exchanged data on the display means as a graph, and third display control means for displaying the exchanged data on the display means in a table format.

A parts management method for managing an order received or order placed for parts, comprises the data exchange step of exchanging data representing a status of the order received or order placed between a plurality of computers, the first display control step of displaying on a display means a combination of data representing the exchanged result of the order received or order placed, and an icon for identifying the order received or order placed, the second display control step of displaying the exchanged data on the display means a graph, and the third display control step of displaying the exchanged data on the display means in a table format.

A computer readable storage medium stores programs for implementing data exchange means for exchanging data representing a status of an order received or order placed between a plurality of computers, first display control means for combining data representing the exchanged status of the order received or order placed, and an icon for identifying the order received or order placed, display means for displaying the combination result, second display control means for displaying the exchanged data on the display means a graph, and third display control means for displaying the exchanged data on the display means in a table format.

According to a preferred aspect of the present invention, the first shop, primary shop, and second shop are independent working units that form a production line.

According to a preferred aspect of the present invention, the icon is an identification display in units of managed items of the order received or order placed in the shop.

According to a preferred aspect of the present invention, the data is the number of processed orders received or orders placed corresponding to a managed item.

According to a preferred aspect of the present invention, the orders received and orders placed are managed by combinations of icons corresponding to managed items and data corresponding to the managed items.

According to a preferred aspect of the present invention, the managed items include "expected", "orders determined", "delayed", "divided orders", "orders modified", "inspection in progress", and "acceptance", which time-serially divide and manage the order received or order placed.

According to a preferred aspect of the present invention, the managed items can be added, changed, and deleted.

According to a preferred aspect of the present invention, the data is updated upon downloading.

According to a preferred aspect of the present invention, each of the managed items displayed as a graph is selected from the managed items displayed by the first display control means.

According to a preferred aspect of the present invention, the reading means extracts and reads only data required for displaying managed items from data stored in the storage means.

According to a preferred aspect of the present invention, the data is the number of received or orders placed in units of days.

According to a preferred aspect of the present invention, a period of the graph displayed is set by an initial display date of reckoning and the number of days inputted by input means.

According to a preferred aspect of the present invention, the number of days has a default value of five days as the reference number of days for order received or order placed management.

According to a preferred aspect of the present invention, the system further comprises third display control means for switching and setting a data update date and parts delivery date as the initial display date of reckoning of the graph, and wherein the graph is displayed.

According to a preferred aspect of the present invention, the system further comprises fourth display control means for switching a display angle of the graph displayed in accordance with a command input from input means, and wherein the graph is displayed.

According to a preferred aspect of the present invention, the method further comprises the third display control step of switching and setting a data update date and parts delivery date as the initial display date of reckoning of the graph, and wherein the graph is displayed.

According to a preferred aspect of the present invention, the method further comprises the fourth display control step of switching a display angle of the graph displayed in accordance with a command input from input means, and wherein the graph is displayed.

According to a preferred aspect of the present invention, the managed items are displayed as combinations of icons for identifying the order received or order placed, and the numbers of data representing results of the order received or order placed.

According to a preferred aspect of the present invention, the second display control means for displaying the order received/placed information of the selected item in the table format displays order received/placed information associated with one or all items selected from the managed items displayed by the first display control means, and inhibits more than one item from being individually selected from the managed items.

According to a preferred aspect of the present invention, the second display control means displays, on the display means in the table format, order received/placed information of one item selected from the managed items, and order received/placed information of an item selected by the additional selection means.

According to a preferred aspect of the present invention, the second display control means displays the same icon as an icon corresponding to the item selected for the table format display in the table format.

According to a preferred aspect of the present invention, the second display control means varies a display position on a screen of the display means in accordance with an input from input means.

According to a preferred aspect of the present invention, the second display control means varies a display size on a screen of the display means in accordance with an input from input means.

According to a preferred aspect of the present invention, the second display control means displays the table format to overlap the display of the managed items on a screen of the display means in accordance with an input from input means.

According to a preferred aspect of the present invention, the second display control step of displaying the order received/placed information of the selected item in the table format includes the step of displaying order received/placed information associated with one or all items selected from the managed items displayed in the first display control step, and inhibiting more than one items from being individually selected from the managed items.

According to a preferred aspect of the present invention, the second display control step includes the step of displaying, on the display means in the table format, order received/placed information of one item selected from the managed items, and order received/placed information of an item selected in the additional selection step.

According to a preferred aspect of the present invention, the second display control step includes the step of displaying the same icon as an icon corresponding to the item selected for the table format display in the table format.

According to a preferred aspect of the present invention, each of the managed items displayed as the graph is selected from the managed items displayed in the first display control step.

According to a preferred aspect of the present invention, the reading step includes the step of extracting and reading only data required for displaying the managed items from data stored in the storage means.

According to a preferred aspect of the present invention, the managed items are displayed as combinations of icons for identifying the order received or order placed, and the numbers of data representing results of the order received or order placed.

According to a preferred aspect of the present invention, the third display control means displays the icon in a table format as common identification information.

According to a preferred aspect of the present invention, the third display control means varies the display position on a screen of the display means in accordance with the input from input means.

According to a preferred aspect of the present invention, the third display control means varies the display size on a screen of the display means in accordance with the input from input means.

According to a preferred aspect of the present invention, the third display control means displays a table format to overlap the display of the managed items or the graph display on a screen of the display means in accordance with the input from input means.

According to a preferred aspect of the present invention, the third display control step includes the step of displaying the icon in a table format as common identification information.

According to a preferred aspect of the present invention, the third display control step includes a step of varying a display position on a screen of the display means in accordance with the input from the input step.

According to a preferred aspect of the present invention, the third display control step includes the step of varying a display size on a screen of the display means in accordance with the input from the input step.

According to a preferred aspect of the present invention, the third display control step includes the step of displaying a table format to overlap the display of the managed items or the graph display on a screen of the display means in accordance with the input from the input step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 7 shows a display of an example of parts management in a spreadsheet format;

FIG. 25A is a flow chart for explaining table format display processing;

DETAILED DESCRIPTION OF THE INVENTION

Preferred embodiments of the present invention will be described in detail in accordance with the accompanying drawings.

[First Display Mode]

Overall Arrangement of System

Figure 2:
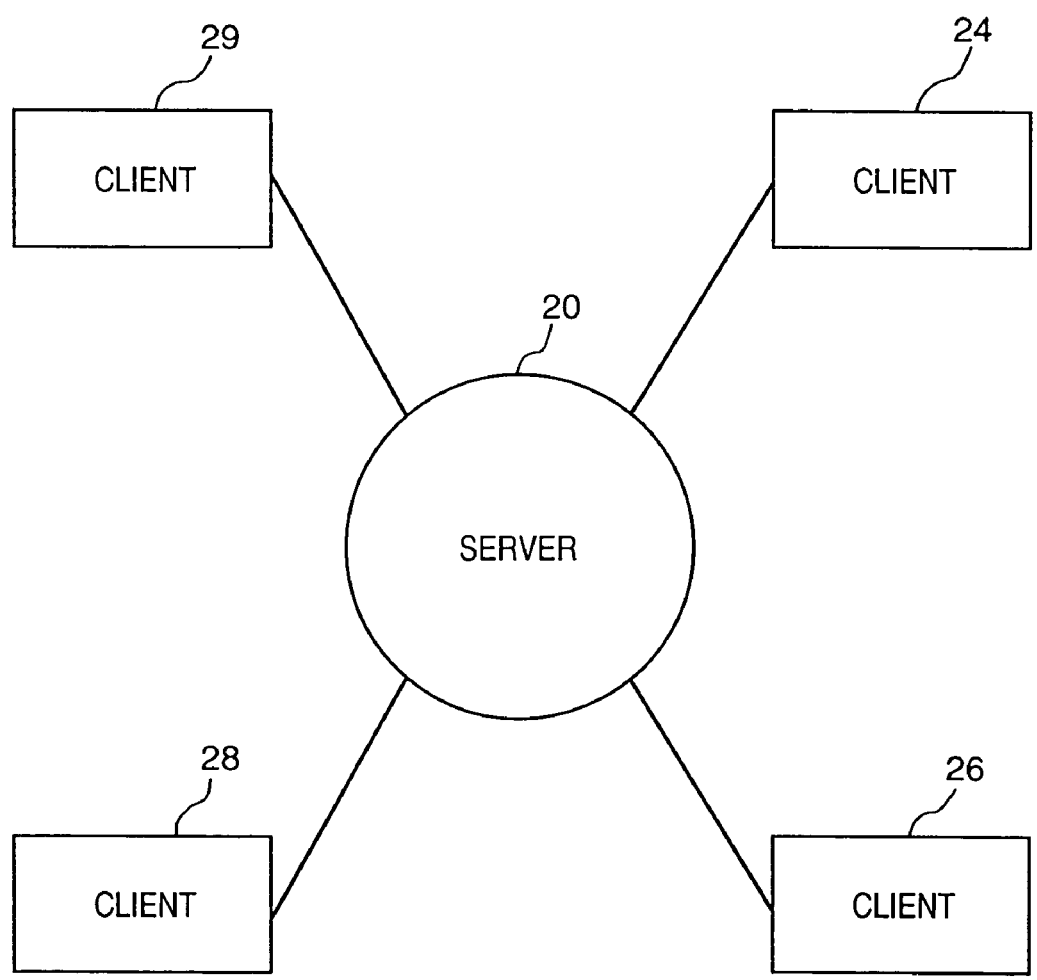
FIG. 2 is a diagram of a client-server system.
Figure 13:
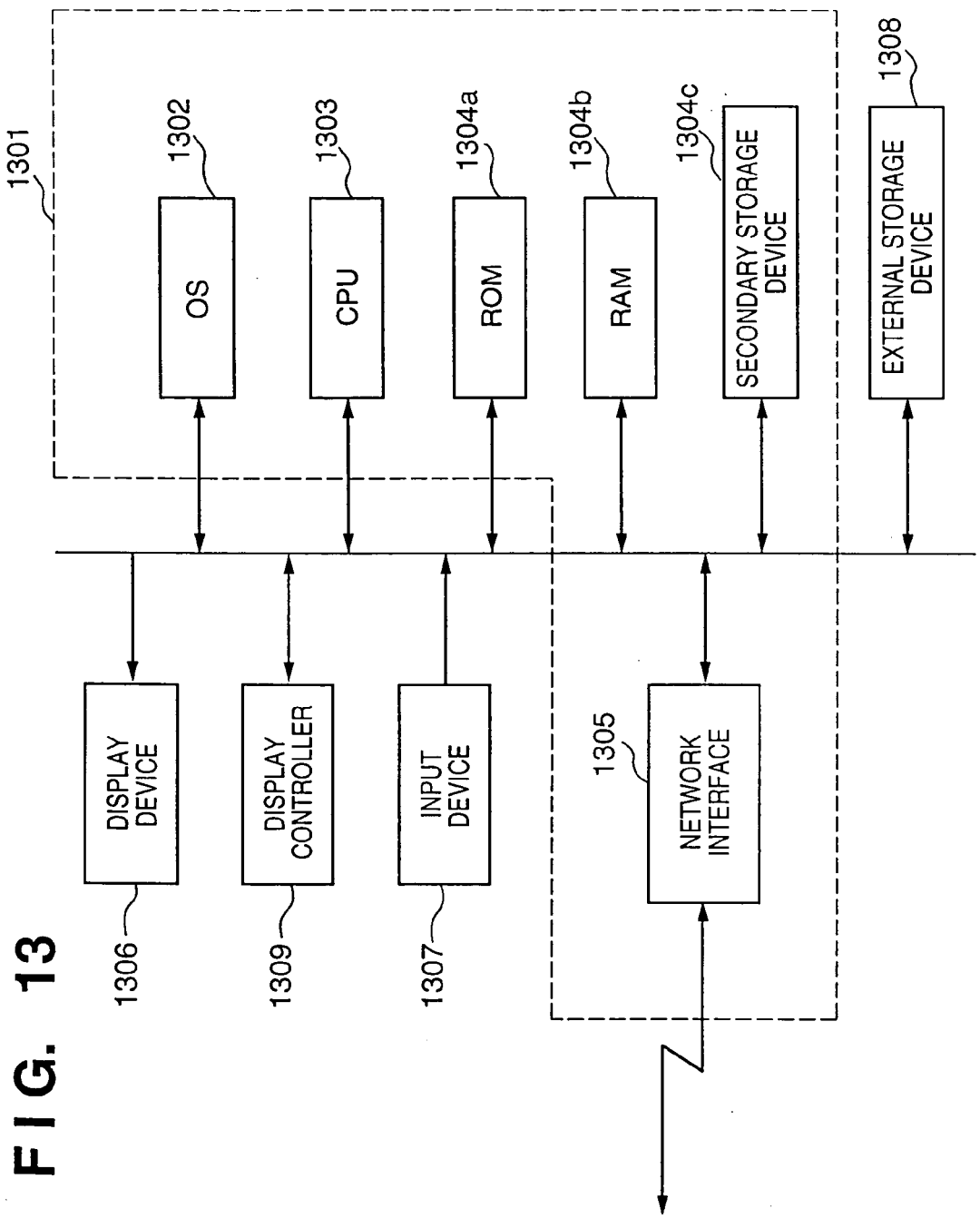
FIG. 13 is a block diagram of the arrangement of computers that construct a client and server system.

The hardware arrangement of the present invention is based on a client-server system (FIG. 2). As shown in FIG. 13, a computer, utilized as both a client and server has a standard arrangement, i.e., comprises an operating system (OS) 1302, CPU 1303, ROM 1304*a*, RAM 1304*b*, secondary storage device 1304*c*, and network interface 1305, and is connected with a display device 1306, display controller 1309, input device 1307, and external storage device 1308.

The input device 1307 is a generic term for input devices used for making operations, e.g., designating a coordinate point on a screen and selecting a target, and so forth. More specifically, the input device includes a trackball, touch pen, joystick, tablet, keyboard, and the like in addition to a mouse. The position and target are designated by a cursor (an arrow or cross-shaped pattern is used) on the screen.

The display device 1306 is a device for displaying data (characters, figures, numerical values, and the like). For a display device, a CRT display, liquid crystal display, plasma display, and the like are available.

The display controller 1309 controls the displaying of the processing result of a program stored in the ROM 1304*a*, RAM 1304*b*, secondary storage device 1304*c*, or external storage device 1308 as storage means on the display 1306.

Data is exchanged among various computers connected to a network via the network interface 1305.

Figure 3:
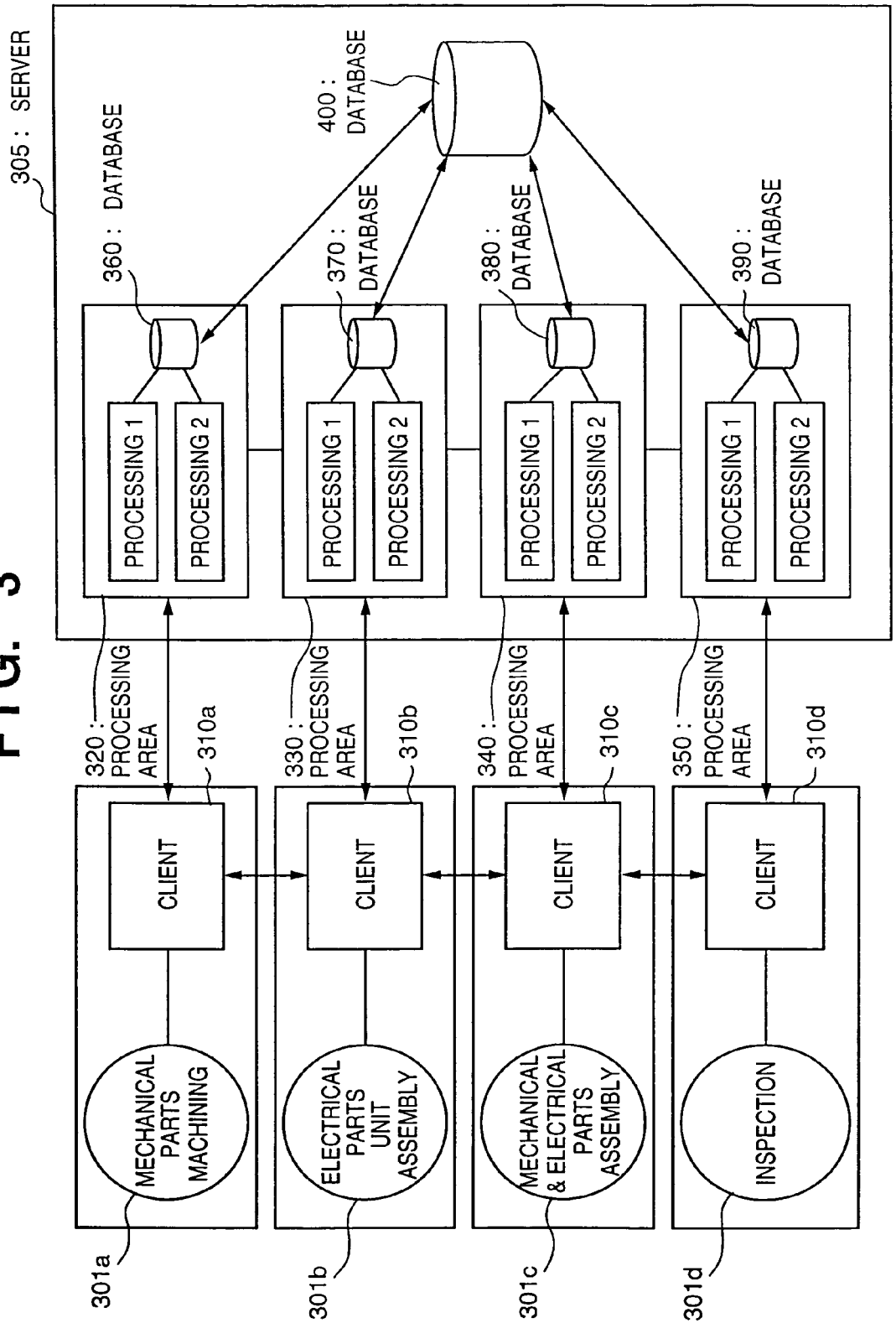
FIG. 3 is a diagram of the relationship among the shops, clients, and server.

FIG. 3 shows the relationship between the shops, clients, and server in a factory. Note that shops indicate work units, with several work units making a production line in the factory.

Assume that there are four shops in the factory: a machining shop 301*a*, electrical parts unit assembly shop 301*b*, mechanical & electrical parts assembly shop 301*c*, and inspection shop 301*d*. These shops correspond to clients 310*a*, 310*b*, 310*c*, and 310*d*. A product is manufactured and inspected by passing through these work units.

A server 305, as the core of the system, is allocated to processing areas (320, 330, 340, and 350) corresponding to the machining client 310*a*, electrical parts unit assembling client 310*b*, mechanical & electrical parts assembling client 310*c*, and inspection client 310*d* of the respective shops.

These processing areas (320, 330, 340, and 350) independently process parts management for the corresponding shops (301*a*, 301*b*, 301*c*, and 301*d*). Databases (360, 370, 380, and 390) correspond to the processing areas (320, 330, 340, and 350) with data storage areas as subdirectories in the external storage device 1308. The databases 360, 370, 380, and 390 store necessary data required for executing independent processing, and data to be referred to among the processing areas are stored in the server database 400.

The server database 400 uses a storage area as a subdirectory in the secondary storage device 1304*c* or external storage device 1308.

For example, when a manufacturing instruction of "300 parts a" is issued to the processing area 320 of the server 305, order receipt/placement information pertaining to "part a" is displayed on the shop 301*a*, which works mechanical parts, via the client 310*a*. Progress information (such as the number of complete parts, acceptance, delay in scheduling, and the like for orders received and orders placed) is registered in the database 360 in the processing area 320 and the database 400 of the server 305 via the client 310*a*.

Similarly, the electrical parts unit assembly shop 301*b*, which manages the electrical parts unit assembly shop, corresponds to the processing area 330 via the client 310*b*. The same applies to the mechanical & electrical parts assembly shop 301*c* (corresponding to the processing area 340), and the inspection shop 301*d* (corresponding to the processing area 350). The processing areas correspond to the process units of the production line, i.e., the human work divisions correspond to computer processing divisions. By reflecting the concept of the human work units into the system, changes such as switching of product models, changes of parts, changes of processes, addition of processes, and the like can be flexibly and quickly coped with. That is, the processing areas can be expanded by connecting them in correspondence with the manufacturing processes (work order).

Figure 28:
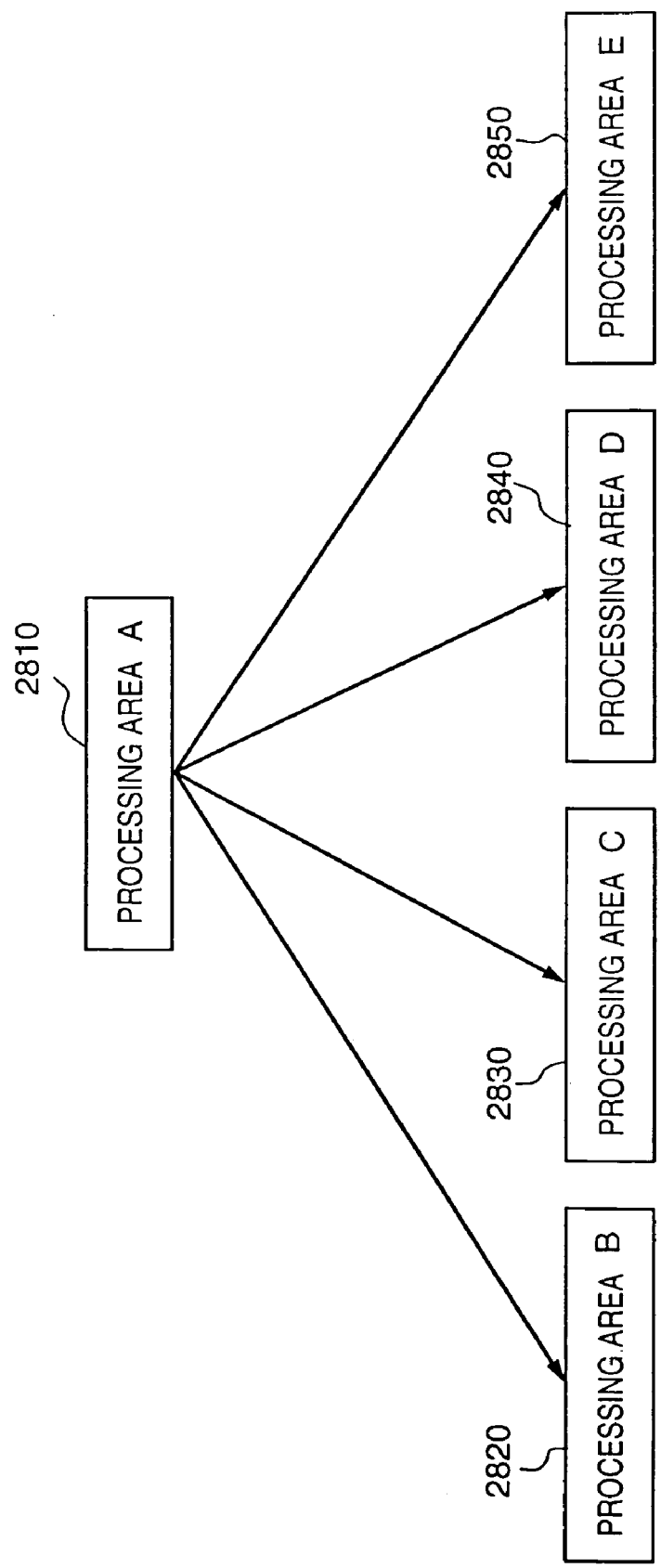
FIG. 28 shows a parallel combination of processing areas.

In case of FIG. 3, the processing areas are configured in series with each other. For example, the processing areas may be configured in parallel with each other, as shown in FIG. 28, or serial and parallel configurations may be combined, as shown in FIG. 29.

Figure 29:
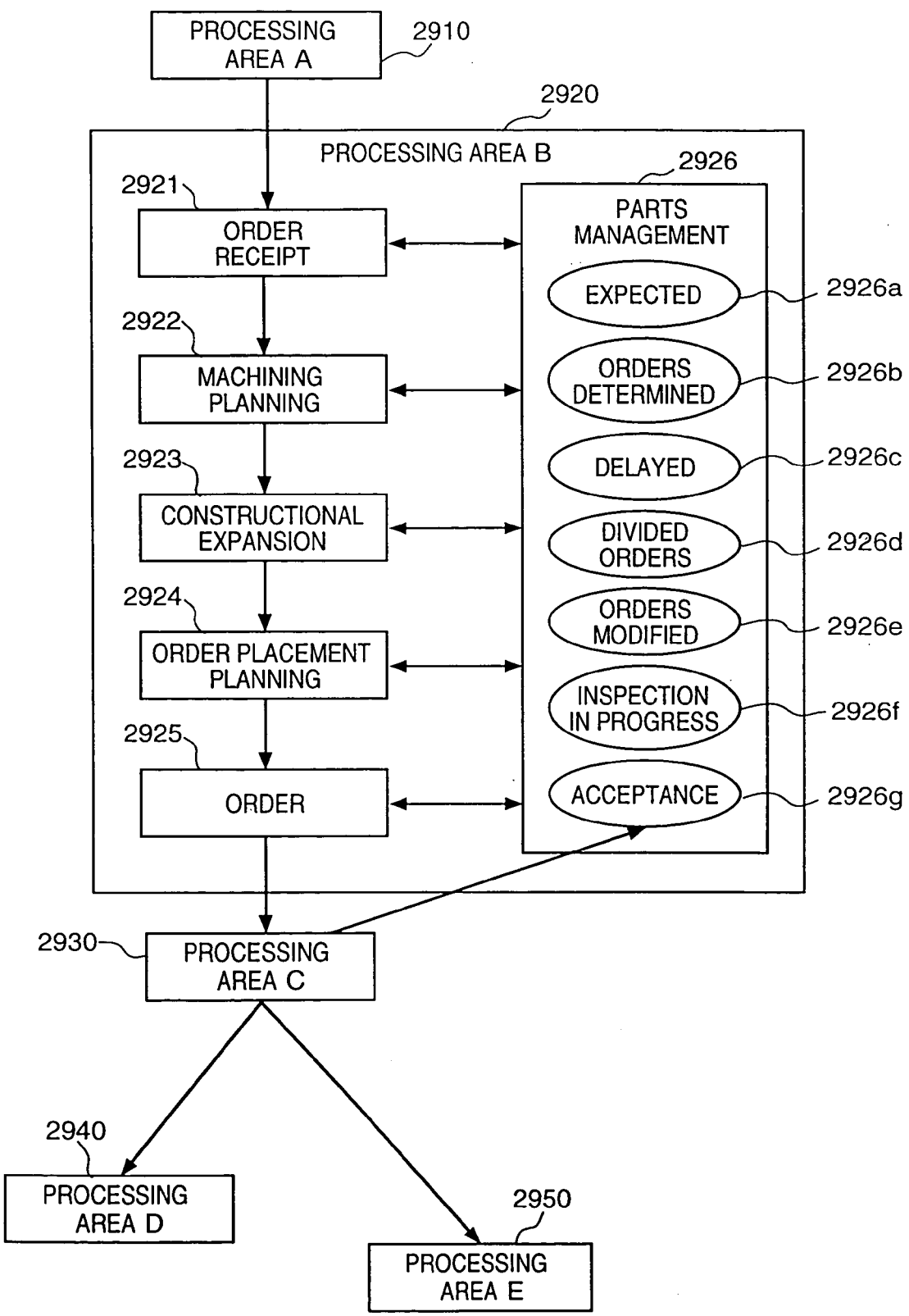
FIG. 29 shows series and parallel combinations of processing areas.

A processing area B 2920 in FIG. 29 shows the functional arrangement of the processing area in detail. Order receipt 2921, machining planning 2922, constructional expansion 2923, order placement planning 2924, and order 2925 process orders to be placed, and parts management 2926 monitors inspection, acceptance, and the like from other processing areas (e.g., area C 2930) in accordance with the orders received, machining planning, and orders placed.

In FIG. 3, the database 400 stores information to be shared among the processing areas, and the internal databases 360, 370, 380, and 390 in the processing areas manage independent data required for the individual processing areas. In FIG. 3, the internal database is contained in a domain for the sake of illustrative convenience. However, the database need not always be contained in the domain in relation to the function of the processing area.

The parts management done in the processing areas of the server includes plan management for managing ordered parts, the number of which has been determined by the order received or order placed, but the detailed specifications of which are not determined yet; order determination management for ordered parts, the final specifications of which have been determined; delay management for checking a delay in scheduling from the designated delivery date; acceptance management for managing ordered parts that have been accepted; and the like, as shown in FIG. 29. These management divisions serve as a means to manage items of the shop. Note that the managed items listed above do not restrict the contents of the present invention but are examples, and various changes may be made in correspondence with various aspects of parts management.

The results of orders received/placed corresponding to the managed items are saved in the databases (360, 370, 380, 390, and 400: FIG. 3) of the server on the basis of a progress input (by the input device 1307 such as a keyboard, mouse, barcode reader, or the like) from the client. The processing areas of the server 305 are linked to the human work areas via the clients (310*a*, 310*b*, 310*c*, and 310*d*), and the outputs from the processing areas are displayed on display means of the clients 310*a*, 310*b*, 310*c*, and 310*d*. The managed items are displayed as a combination of an icon display that can identify the orders received and orders placed, and the number of orders representing the results of orders received/placed.

For example, the processing results from the processing area 310 of the server are displayed for the operator of the machining shop 301a via the client 310a.

When the operator of the machining shop 301a inputs status information (the number of complete parts, and the like) by the input device 1307 such as a keyboard, the client 310a returns that input information to the processing area 320. The processing area 320 executes "inspection" on the basis of that input information.

Furthermore, the processing executed in the processing area includes search processing for updating the contents of the database 360 on the basis of the progress information, and transferring data to the client side, and the like. Communications between the clients (310a, 310b, 310c, and 310d) and server 305 are made via the network interface 1305. Data transferred from the client side to the server 305 side is temporarily queued in the RAM 1304b. The OS 1302 issues an instruction, and the CPU 1303 executes processing.

The processing result of the processing area 320 is stored in the database 360. If data has an attribute common to the respective shops, such data is identified by the presence/absence of a flag or the like, and is saved in the database 400 of the server 305.

In this way, in the database arrangement of the present invention, since required databases are scattered around in units of processing areas, and shared data are managed with integrity, system redundancy can be eliminated, and the reliability can be improved as compared to a conventional simultaneous parts management information system which cannot refer to all the data if the system goes down. Furthermore, since accesses to the storage device can be minimized, the system can perform high-speed processing.

The same processing contents apply to the electrical parts unit assembly shop 301b, mechanical & electrical parts assembly shop 301c, and inspection shop 301d.

Relationship Between Order Receipt/Placement Among Shops

Figure 4:
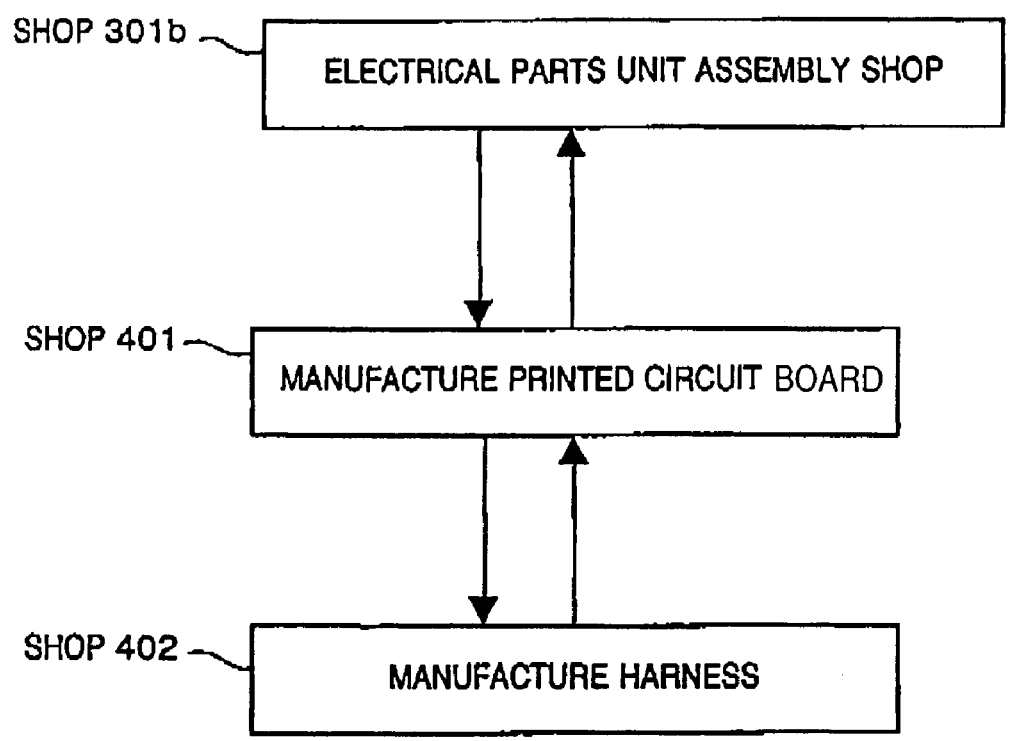
FIG. 4 is a chart of an example of the relationship between the order placement and receipt among shops.

FIG. 4 exemplifies the relationship between the order receipt and placement with reference to the electrical parts unit assembly shop 301b (FIG. 3). The downward arrow indicates a placed order, and the upward arrow indicates a delivery of parts corresponding to an order. The shop 301b places orders with a shop 401 for a printed circuit board and harness required for assembly, and the shop 401 places an order with a shop 402 for the harness required in the manufacture of the printed circuit board. The shop 401 manufactures a printed circuit board by attaching the harness manufactured by the shop 402 to the circuit board on the surface of which electronic parts are mounted. The unit assembly shop 301b does final assembly using the printed circuit board manufactured by the shop 401. The three shops receive and place orders among themselves.

Figure 5:
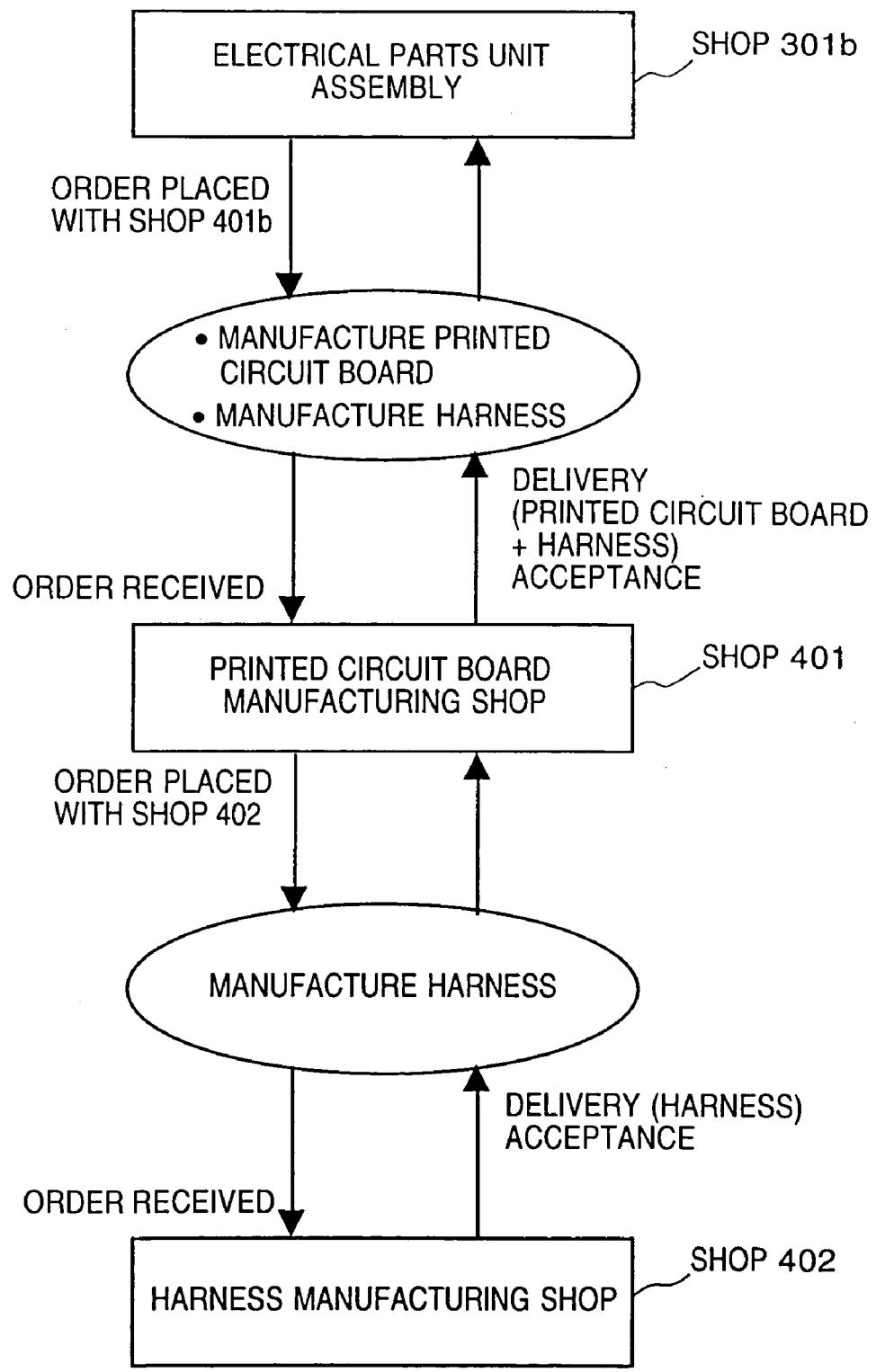
FIG. 5 is a chart of an example of the relationship between the order placement and receipt among shops.
Figure 6:
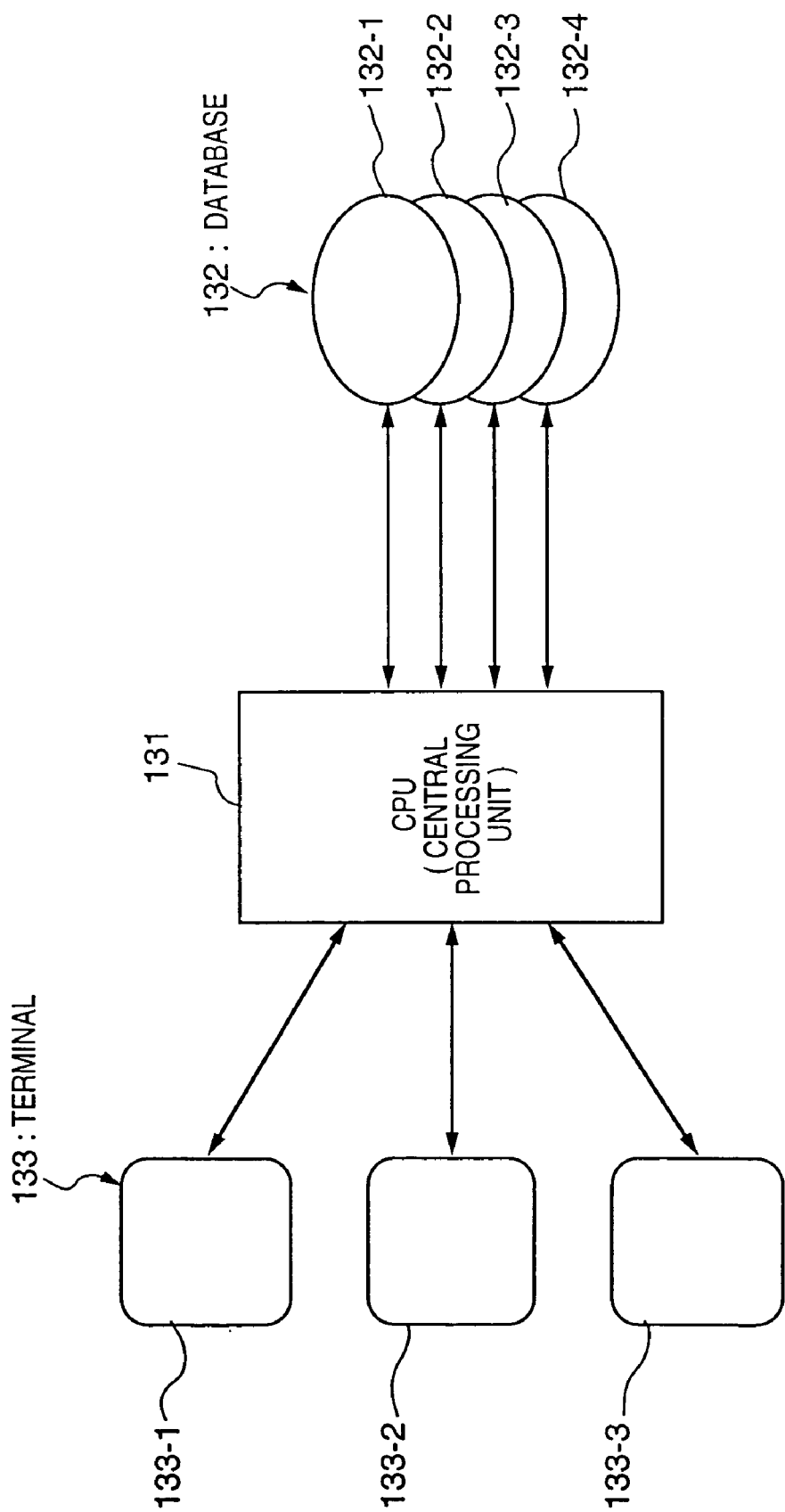
FIG. 6 is a diagram for explaining the concept of a conventional parts management information system.

FIG. 5 shows the relationship between the order receipt and placement in more detail. The shop 301b places orders with the shop 401 for a printed circuit board and harness. In this case, the shop 401 receives orders for the printed circuit board and harness. The shop 401 manufactures the printed circuit board, itself, but orders the shop 402 to manufacture the harness. In this case, the shop 402 receives an order for the manufacture of the harness from the shop 401.

The shop 402 delivers the manufactured product (harness) to the shop 401, and the product is inspected for acceptance. After being accepted, the order received from the shop 401 is complete.

The shop 401 delivers the manufactured product (printed circuit board) of its primary shop and the ordered article (harness) received from the shop 402 to the shop 301b, and these articles are inspected for acceptance. After being accepted, the order received from the shop 301b is complete.

Data exchange between clients and server and the relationship between order receipt and placement among the shops have been explained. The display data processed by the server on the client side for parts management will be explained below.

Screen Display on Client Computer

There are three display modes, i.e., "managed item display", "graph display", and "table format display" modes for parts management. Of these modes, detailed information of the graph and table format display modes can be selectively combined with that of the managed item display mode as a fundamental mode. Parts management information sent from the server is displayed on the display device 1306 under the control of the display controller 1309.

(Managed Item Display)

Figure 1:
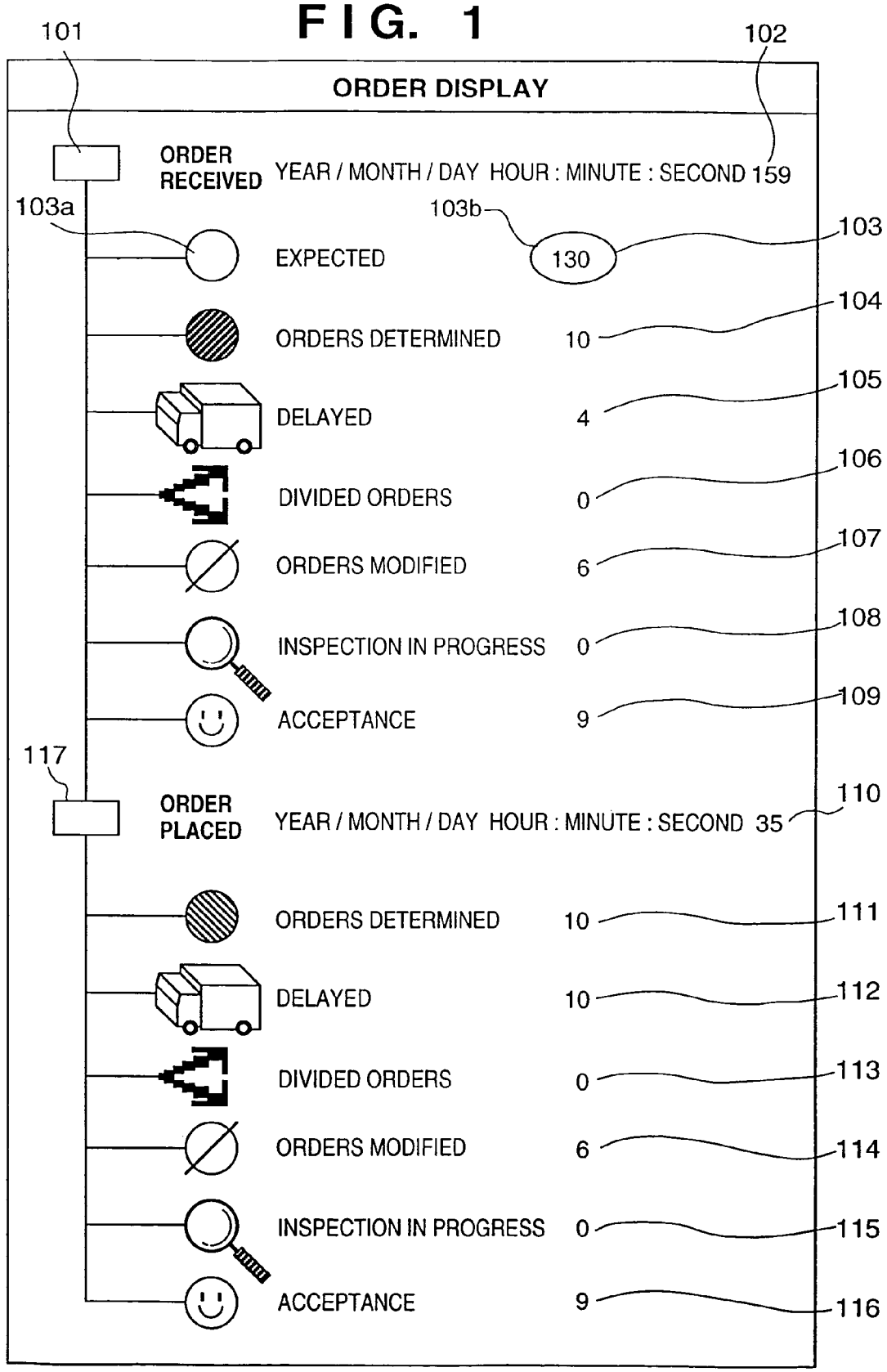
FIG. 1 shows a combination display of icons and data for order received/placed management.

The managed item display window time-serially classifies and displays the processing status from order receipt until acceptance. The order received/placed processing status is displayed on the client computer of each shop (FIG. 1). FIG. 1 shows the screen display on the client computer. This screen display is used by the shop 401 for managing orders received from the higher-order shop 301b and orders placed with the lower-order shop 402 in the order receipt/placement relationship shown in FIG. 5.

The function of the shop 401 is to deliver articles (in this case, the printed circuit board and harness) ordered by the higher-order shop 301b on the designated delivery date. In order to carry out said function, a display 101 (including reference numerals 102 to 109) for managing the items of the primary shop (manufacture of a printed circuit board), and a display 117 (including reference numerals 110 to 116) for managing an order (for the manufacture of a harness) placed with the shop 402 are displayed.

The managed items in the shop are classified by corresponding icons, and the numbers of data corresponding to the managed items are displayed together with the icons. Since the icons and data are displayed in combination, the operator can directly; visually confirm the order received/placed processing status. The icons displayed symbolize the work units in the shop, and can obviate the need for search while interpreting character information.

Combination of Displays of Icons and Numbers of Data

Note that "icons" correspond to display units of the managed items upon receiving/placing orders in the shop. A "data display" indicates the number of orders corresponding to each managed item, and displays the order receipt/placement processing status. The respective managed items will be described below based on the display in FIG. 1.

An icon 101 corresponds to a display for management of orders received from the shop 301b, and displays the total number of orders received. The last update timing of the number of orders received is displayed in the form of year (YY), month (MM), day (DD), hour (H), minute (M), and second (S). The year, month, and day data, and hour, minute, and second data to be displayed are obtained by referring to an internal system calendar and system clock of the OS 1302 of the computer 1301. The data display juxtaposed to the icon 101 indicates that the number of orders received is 159.

An icon 117 corresponds to a display of management of orders placed with the shop 402, and displays the total number of orders placed. The last update timing of the number of orders is displayed in the form of year (YY), month (MM), day (DD), hour (H), minute (M), and second (S) as in the icon 101. The data display juxtaposed to the icon 117 indicates that the number of orders placed is 35.

This system does not update data by communications between the clients and server at given time intervals or at predetermined timings so as to reduce the load on the system. Instead, when the operator inputs a data update request, the data of the corresponding shop is updated. Since data is not updated by periodic communications between the server and clients, high efficiency of hardware resources can be maintained.

Hence, since data is not periodically updated, the last update timing of the data is displayed in combination with the icon 101 or 117.

The data update request is input from the input device 1307 such as a mouse, keyboard, or the like into an input column (not shown) on the display device 1306.

When the update request is input, a data update module 2602 stored in a recording medium is started via the CPU 1303. This program module may be stored in one of the secondary storage device 1304c, external storage device 1308, ROM 1304a, and RAM 1304b as the storage means of the computer 1301.

Data Update

Figure 26:
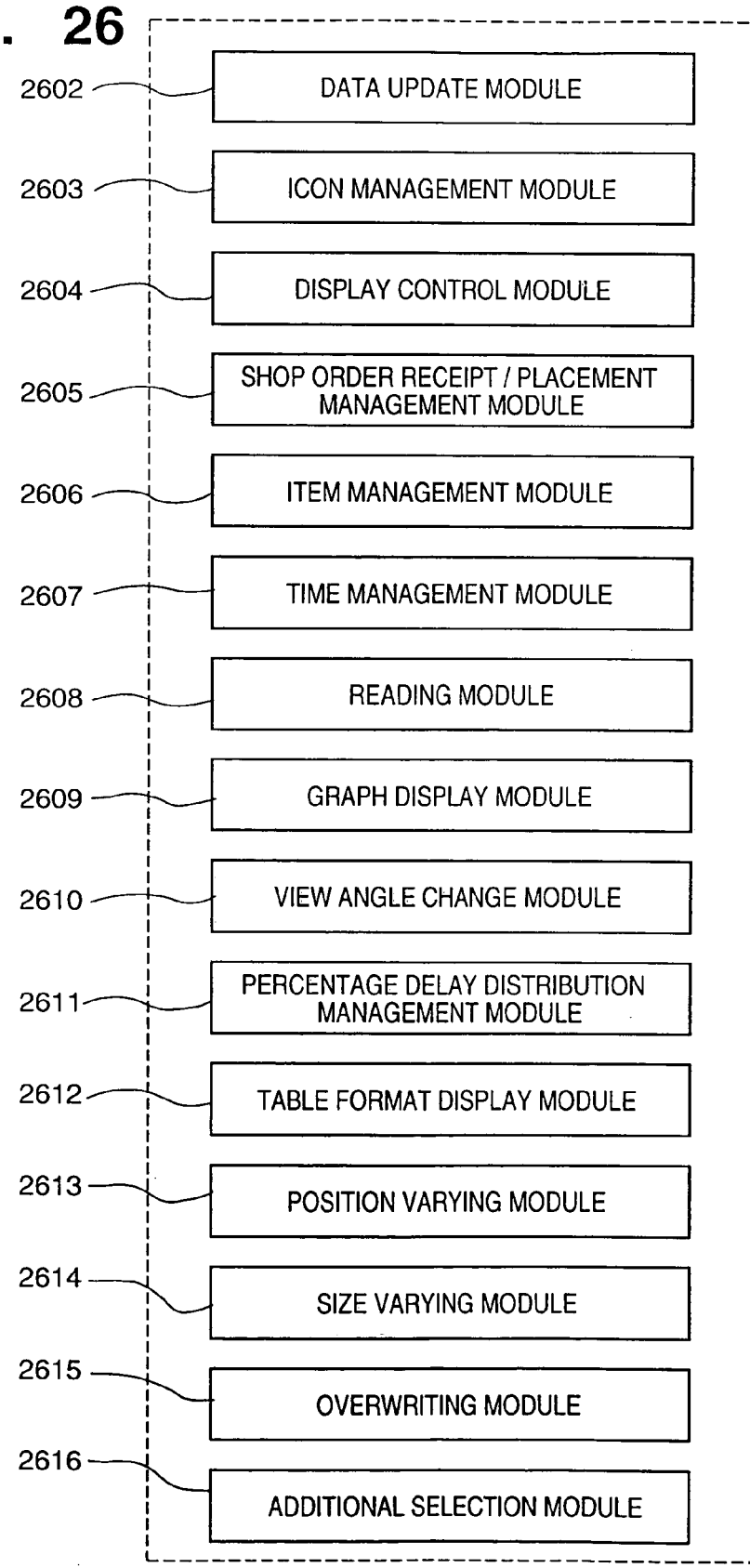
FIG. 26 shows a memory map of a recording medium which records program modules according to the present invention.

Execution of the program will be explained below with reference to FIG. 12. When the data update request is input (S1201—YES), the data update module 2602 shown in FIG. 26 is started to search the databases (S1207: 400, 360, 370, 380, and 390 in FIG. 3) on the server side (S1205). The obtained data is downloaded to and saved in one of the storage devices (RAM 1304b, secondary storage device 1304c, and external storage device 1308) on the client side (S1206). Data exchange between the server 305 (FIG. 3) and clients (310a, 310b, 310c, and 310d: FIG. 3) is made via the network interface 1305. The data downloaded to the client side is saved in the above-mentioned storage device. Upon completion of data saving, execution of the data update module 2602 ends. The downloaded data is used as a default value of the data on the client side until the next data update request is input. Data to be searched in step S1205 is that associated with items defined by registered icons (to be described below), and any new registered icon is searched upon data update after registration.

Register, Change, and Delete Icons

Icons, as the managed item display, can be registered corresponding to the user's management mode, and items can be added, changed, and deleted. Addition, change, or deletion of an icon (S1202—YES) is executed when a command is input from the input device 1307 such as a mouse, keyboard, or the like to an input column (not shown) on the display device 1306. The execution result is saved in one of the storage devices (RAM 1304b, secondary storage device 1304c, and external storage device 1308) of the client side (S1208). Note that the saved icon is to be searched (S1205, S1207) at the next data update (S1201—YES). When icons are generally used, they may be saved in advance on the ROM 1304a.

"Change" means changing the name of the icon display. An appropriate managed item name can be assigned in correspondence with the management situation. For example, an icon "DELAYED" in FIG. 1 may be changed to a name corresponding to an actual management situation such as "DELAY IN SCHEDULING" or "OVERDUE".

"Deletion" means excluding a registered icon from those to be displayed. The deleted icon (managed item) is excluded from data to be searched during the next data update.

Combination of Displays of Icons and Numbers of Data

Figure 12:
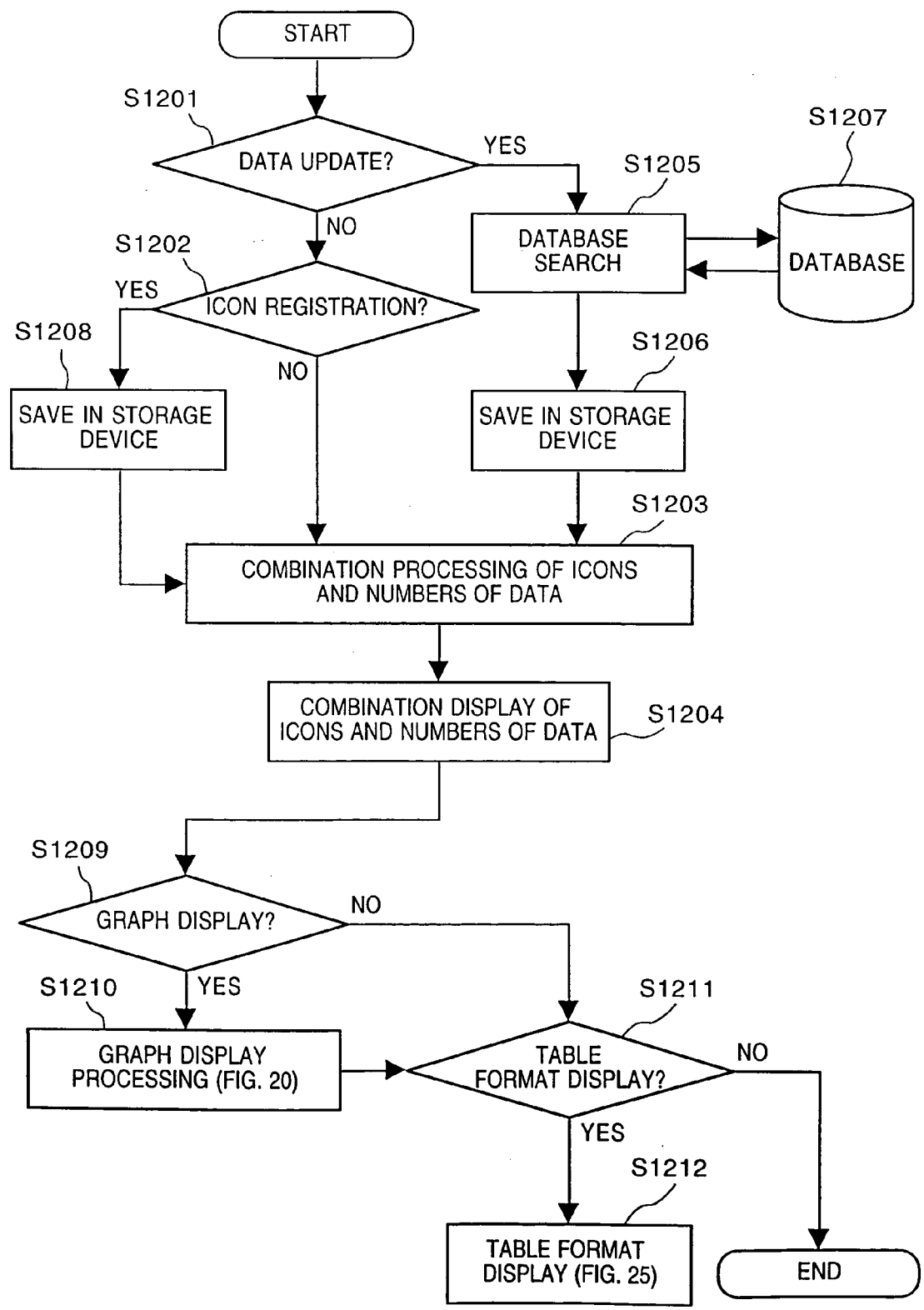
FIG. 12 is a flow chart for explaining combination display processing of icons and the number of orders.

The combination display of icons (managed items) and the numbers of data corresponding to the icons is processed in step S1203 in FIG. 12, and the combination processing of the icons and the numbers of data are implemented by a display control module 2604. In this case, icons saved in the storage devices (ROM 1304a, RAM 1304b, secondary storage device 1304c, and external storage device 1308) of the client side and data corresponding to the icons are to be combined. Logical determination is made by the CPU 1303 of the computer 1303 that constructs the client-server system (S1203). The display control module 2604 outputs the processing result (combinations of icons and numbers of corresponding data) to the display controller 1309, which displays a managed item display window 170 (FIG. 1) on the display device 1306 (FIG. 1) (S1204). In this manner, the display controller 1309 receives combination information of the icons and the numbers of corresponding data from the display control module 2604, and displays that information on the display device 1306.

The display controller 1309 determines if the data to be displayed corresponds to (a) both orders received and orders placed (FIG. 1), (b) orders received alone (the number of orders placed is zero) (FIG. 8), or (c) orders placed alone (the number of orders received is zero) (FIG. 9), and controls the display screen accordingly. Also, the display controller 1309 can directly display data received from the display control module 2604 on the display device 1306.

In step S1204, the overall order received/placed a status of the shop as a combination of the icons and the numbers of data is displayed. This display serves as a basis for parts management as managed item display. Furthermore, this display allows graph display and table format display modes used for analyzing the order receipt/placement processing in detail. Step S1209 checks in if a graph display is to be made. If the graph display is made (S1209—YES), the flow advances to step S1210. The processing for the graph display is executed in accordance with the flow chart shown in FIG. 20. The contents of this processing will be explained later in the second display mode.

If the graph display is not made (S1209—NO) or after the graph display is done (S1209), it is checked if a table format display is to be made. If the table format display is to be made (S1211—YES), the flow advances to step S1212. The processing for the table format display is executed in accordance with the flow chart shown in FIGS. 25A, B. The contents of this processing will be explained later in the third display mode.

In this display mode, the display control module 2604 (FIG. 26) and the display controller 1309 (FIG. 13) serve as a first display control means, and display icons used for identifying order receipt or placement, and the numbers of data indicating the results of orders received/placed on the display device 1306.

Details of Icon Display

The managed items will be described in detail below. In FIG. 1, order received management is classified into seven items to be displayed, and order placed management is classified into six items to be displayed.

"EXPECTED" 103 represents orders expected to be received from another shop (the shop 301*b* in case of, e.g., FIG. 4), and the number of orders expected to be received is displayed in combination with the icon. For example, orders, the total quantity of which has been determined, but detailed specifications (colors, materials, finish classes, and the like) of which are not determined yet, are displayed here. With this data, the number of orders which are determined within a predetermined period (e.g., within 5 days in consideration of the manufacturing lead time), and are put into the shop can be confirmed. In case of FIG. 1, the number of orders expected to be received is 130. Note that there is no "EXPECTED" display in order placed management (under the icon 117) because it is unnecessary to display expected outgoing orders from the primary shop.

"ORDERS DETERMINED" (104, 111) indicates ordered articles for which conditions such as specifications, delivery dates, quantities, and the like have been determined, and is displayed in combination with the number of orders for which these conditions have been met. When an order is determined, it is deleted from the "EXPECTED" display so that the same order can be prevented from duplicating in the display under the "EXPECTED" and "ORDERS DETERMINED" items. This processing is done by normal read and write to the databases in the client-server system. Progress information of a normal ordered article can be confirmed by "ORDERS DETERMINED" item. In case of FIG. 1, 10 orders have been determined.

"DELAYED" (105, 112) indicates ordered articles that have not yet been accepted by the designated delivery dates, and is displayed in combination with the number of orders which have not yet been accepted. This icon indicates an abnormal condition for the job to be processed by the shop. Since the abnormal condition is actively displayed from the system for the operator, the operator can confirm the status of a delay in scheduling early, can change the order of priority of jobs, and can place an urgent order with another shop. In case of FIG. 1, four orders to be processed in the primary shop and ten orders that have been ordered to another shop are delayed in scheduling.

"DIVIDED ORDERS" (106, 113) indicates ordered articles that have been divided into two or more orders or that have been requested to be divided, after their orders had been determined. In case of FIG. 1, the number of divided orders is zero.

"ORDERS MODIFIED" (107, 114) indicates ordered articles whose specifications, and the like have been modified after their orders have been determined. In case of FIG. 1, the number of orders whose specifications have been modified is 6. Such division and modification histories are recorded in the databases (400, 360, 370, 380, and 390) of the server.

"INSPECTION IN PROGRESS" (108, 115) indicates ordered articles which have been delivered to the order sender and are undergoing inspection. In case of FIG. 1, the number of ordered articles under inspection is zero.

"ACCEPTANCE" (109, 116) indicates ordered articles which have been delivered to the order sender and have been accepted. In case of FIG. 1, the number of orders that have been accepted is 9.

As described above, a series of information from orders expected to be received to acceptance in the shop are time-serially classified and displayed. The operator or shop manager can confirm the required information and the numbers of data and can manage the shop.

Furthermore, when the operator wants to confirm the numbers of data in more detail, an icon is selected by the input device 1307 such as a mouse, trackball, or the like, and can visually observe data in a spreadsheet format or graph display window. Such display windows will be described in detail later.

Managed Item Display for Orders Received Alone

A display focused on the shop 402 in FIGS. 4 and 5 will be examined below. Since the shop 402 has orders received but has not placed any orders with other shops (810 in FIG. 8; the number of placed orders=0), it need only manage items of the primary shop.

Figure 8:
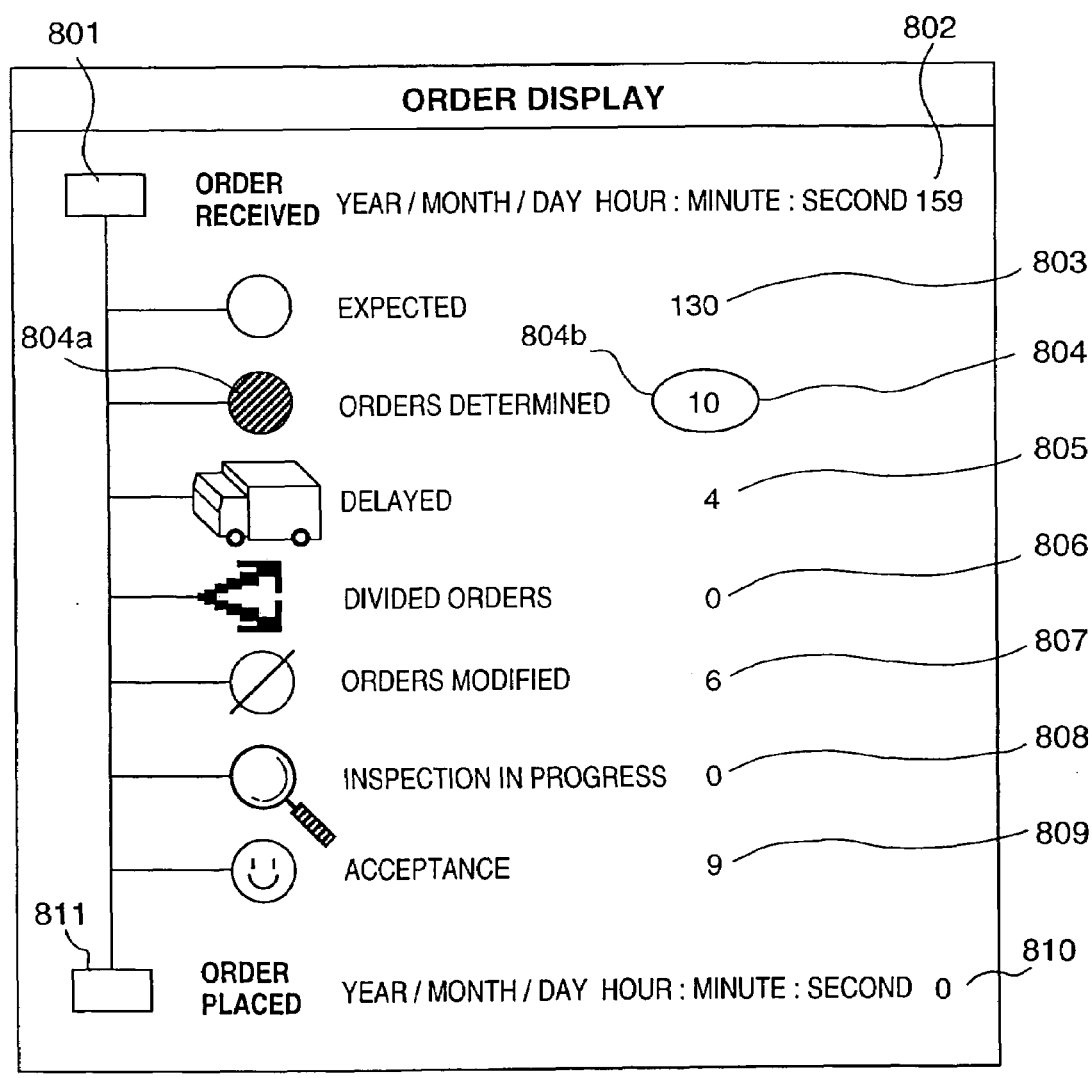
FIG. 8 shows a combination display of icons and data of a shop that processes orders received alone.

The client computer of the shop 402 displays only items to be managed by the primary shop on the screen, as shown in FIG. 8. The definitions of the icons are the same as those in FIG. 1.

In FIG. 1 that manages both order receipt and placement, if there are no orders to be placed with other shops, since items to be managed by the primary shop need only be displayed, the display screen becomes as shown in FIG. 8. The combination display processing of the icons and the numbers of data is executed by the data display module 2604, and the processing result is displayed under the control of the display controller (1309 in FIG. 13). The display controller 1309 determines if the data to be displayed corresponds to (a) both orders received and orders placed, (b) orders received alone, or (c) orders placed alone, and controls the display screen accordingly. In the following case of orders placed alone, the same determination is done. The following case of orders placed alone is opposite to that of orders received alone.

Managed Item Display for Orders Placed Alone

A display focused on the shop 301*b* in FIGS. 4 and 5 will be examined below. Since the shop 301*b* has orders placed with but has not received any orders from other shops (902 in FIG. 9: the number of received orders= 0), it need only manage the items of the shop as order receiver.

Figure 9:
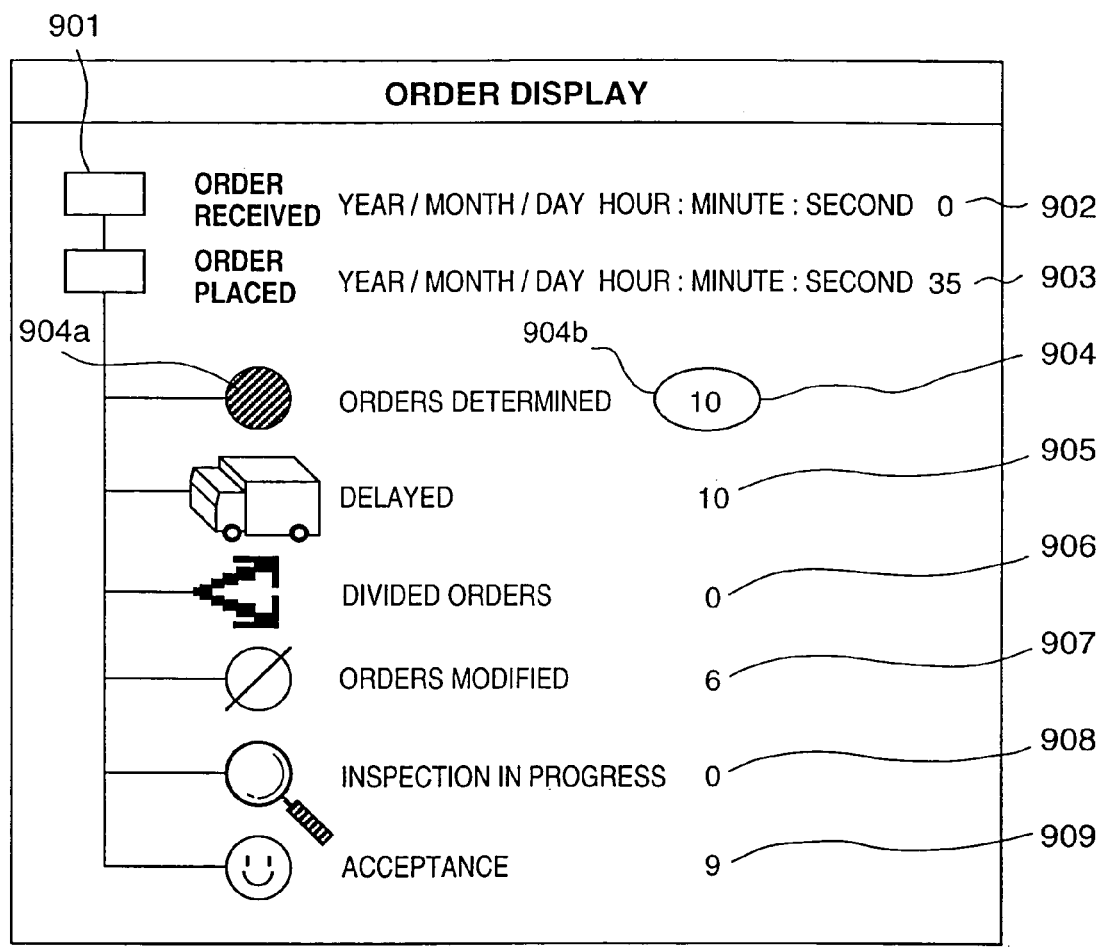
FIG. 9 shows a combination display of icons and data of a shop that processes orders placed alone.

The client computer of the shop 402 displays only items to be managed by the shop as order receiver on the screen, as shown in FIG. 9. The definitions of the icons are the same as those in FIG. 1.

In FIG. 1 that manages both order receipt and placement, if there is no processing of the primary shop but only items associated with orders placed with other shops are to be managed, the display screen becomes as shown in FIG. 9. The screen control for displaying only items associated with orders placed is the same as that in the case of orders received alone.

As described above, there are three cases depending on order received and order placed patterns, i.e., a case wherein both the items to be processed by the primary shop and items associated with orders placed with another shops are displayed (FIG. 1), a case of orders received alone (there are no orders placed) (FIG. 8), and a case of orders placed alone (there are no orders received, or even when orders are received, they are not processed by the primary shop and are placed with another shop) (FIG. 9).

When Order Sender:Order Receiver=1:n or n:1

Figure 10:
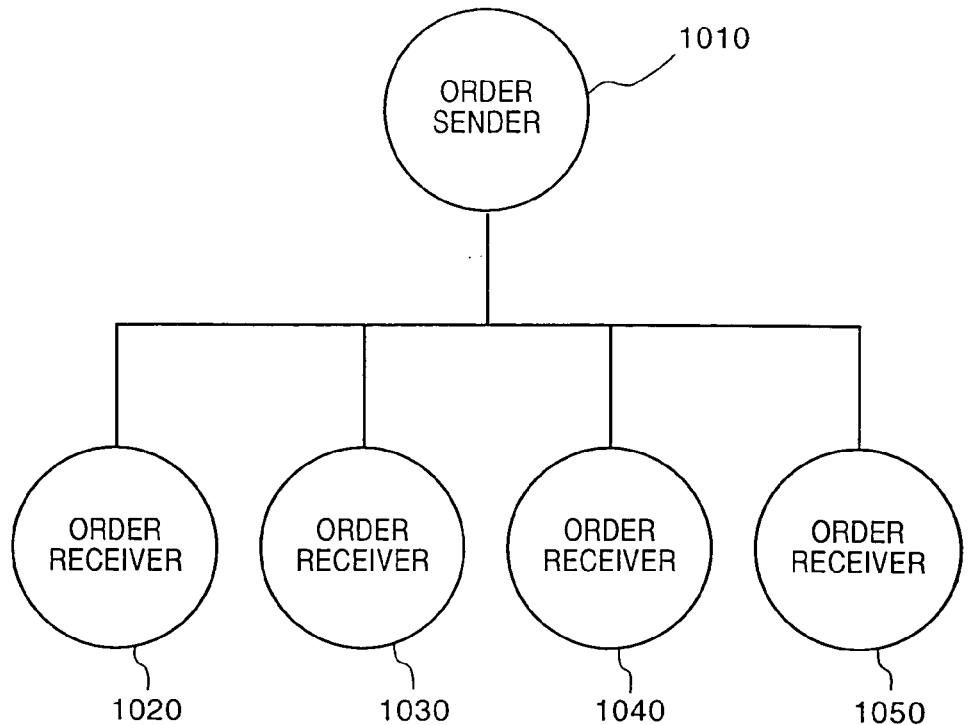
FIG. 10 is a diagram for explaining processing when there are a plurality of order receivers.

Even when there is a plurality of order receivers, as shown in FIG. 10, or there is a plurality of order senders, as shown in FIG. 1, the system of the present invention can be applied by specifying the order receipt/placement relationship upon selecting the order receiver or sender.

More specifically, when an order receiver 1030 is selected in FIG. 10, a display that pertains to an primary shop 1010 and the order receiver 1030 is obtained.

Figure 11:
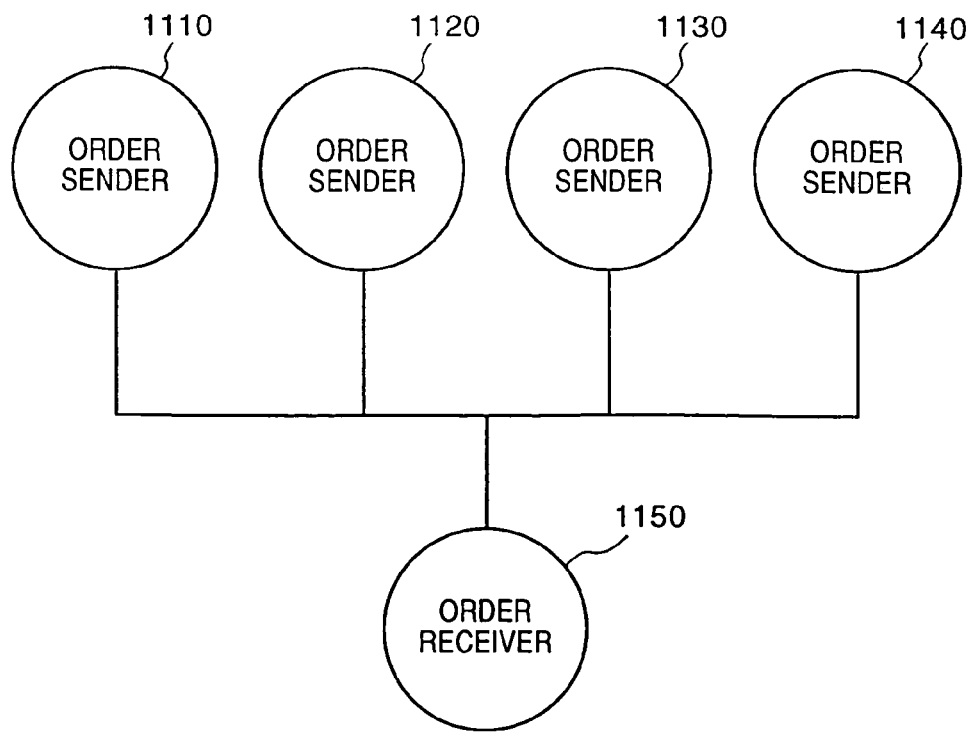
FIG. 11 is a diagram for explaining processing when there are a plurality of order senders.

On the other hand, when an order sender 1120 is selected in FIG. 11, a display that pertains to shops 1120 and 1150 is obtained.

One of the plurality of order receivers or senders can be selected by inputting a command to an input column (not shown) on the display device 1306 from the input device 1307 such as a mouse, keyboard, or the like. When the selection input is made, a shop order receipt/placement management module 2605 of program modules shown in FIG. 26 is started via the CPU 1303. The shop order receipt/placement management module 2605 manages orders received/placed among shops. The program modules 2602 to 2605 may be stored in one of the secondary storage device 1304*c*, external storage device 1308, ROM 1304*a*, and RAM 1304*b* as the storage means of the computer 1301.

Since the managed items of orders received and orders placed are displayed as combinations of icons and numbers of data corresponding to the individual managed items, the processing of a status of orders received and orders placed in the shops can be directly managed. More specifically, the operator can be directly informed of an abnormal condition such as a delay in scheduling, and need not search numerical value data (model numbers, quantities, delivery dates, and the like) upon every confirmation, thus preventing confirmation errors of the operator. Furthermore, since the operator can selectively search required information, the work time required for data search can be shortened.

In addition, when only orders placed for parts are to be managed, since items for managing the order receiver are displayed as combinations of icons and numbers of data corresponding to the individual managed items, the processing of a status of the order receiver can be directly managed.

Similarly, when only orders received of parts are to be managed, since items for order received management are displayed as combinations of icons and numbers of data corresponding to the individual managed items, the processing of a status of order receipt processing can be directly managed.

[Second Display Mode]

(Combination of Managed Item and Graph Display Windows)

Figure 14:
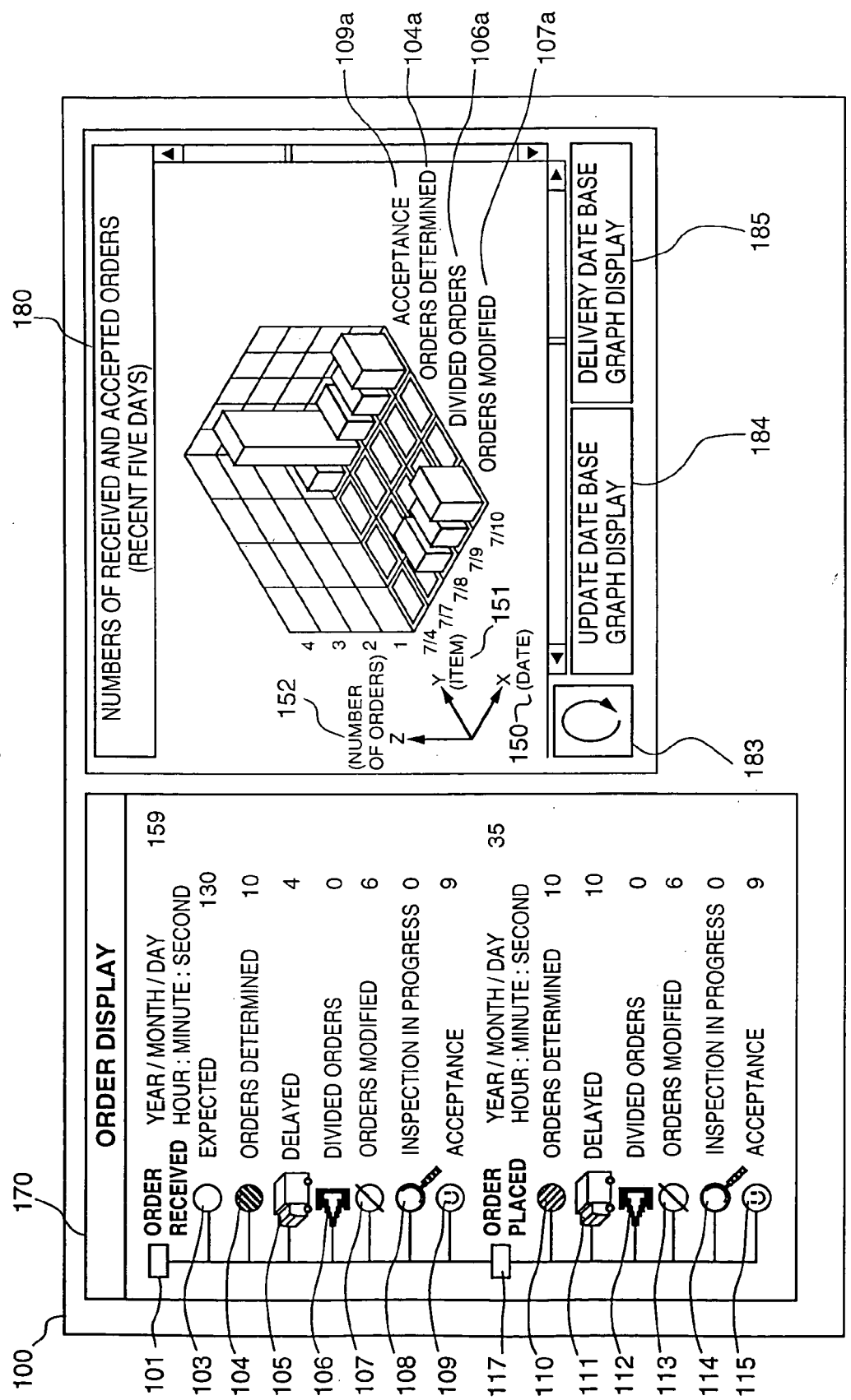
FIG. 14 shows an order received/placed management screen including managed item and graph display windows.

FIG. 14 shows a screen display 100 of the client computer, and the shop 401 in FIGS. 4 and 5 will be taken as an example of the shop to be displayed. The screen display 100 includes a managed item display window 170 and graph display window 180. The managed item display window 170 displays combinations of icons for identifying orders received and orders placed, and the numbers of data indicating the results of the order received/placed corresponding to the icons, and is the same as that has been described previously. A graph display window 160 displays the results of orders received/placed in units of days in association with the item (icon) selected from the managed item display window 170. Since the icons in the managed item display window 170 have already been described above, a detailed description thereof will be omitted. The graph display will be explained below with reference to the flow chart in FIG. 20. Combinations of icons and numbers of data are displayed as a default screen (FIGS. 1, 8, and 9, S1204: FIG. 12), and if the graph display is not made (S2001—NO), combinations of icons and numbers of data corresponding to the items are displayed on the display device 1306 of the client computer. In this case, the managed item display window 170 shown in FIG. 1 alone is displayed.

If the graph display is made (S2001—YES), an item to be displayed as a graph is selected (S2002). The item is selected by selecting and inputting one of the items of the managed item display window 170 using the input device 1307 such as a mouse, keyboard, trackball, or the like. Note that selection need not be made every time the graph is displayed, and an item which has been selected in advance and saved in the storage device (ROM 1304*a*, RAM 1304*b*, secondary storage device 1304*c*, or external storage device 1308) may be displayed as a graph. The selection input and saving of the item to be displayed as a graph are processed by an item management module 2606 shown in FIG. 26. All the managed items need not be displayed, only important items an be displayed. When the managed item display window 170 and graph display window 180 are displayed on a single screen, the correspondence among items can be clarified, and comparison in units of items can be easily made.

Referring back to FIG. 20, the time axis of the graph display window is set. That is, an initial date of reckoning for the graph display window is set. If the set date is not changed (S2003—NO), a default value is set (S2004); otherwise (S2003—YES), one of setup based on the last data update date (date update date) (S2009—YES, S2010) or setup based on the delivery date of parts (S2009—NO, S2011) is selected.

The default value is "five days from a display reference date", and this data is saved in one of the storage devices (ROM 1504*a*, RAM 1604*b*, secondary storage device 1604*c*, and external storage device 1608). The time axis setup processing (S2003, S2004, S2009, S2010, and S2011 in the flow chart of FIG. 20) is processed by a time management module 2607 shown in FIG. 26.

In these steps, the item to be displayed and its time (period) are set. Data corresponding to the selected item (S2002) and set period (S2004, S2010, S2011) are retrieved from the databases (S2012 in FIG. 20, 400, 360, 370, 380, and 390 in FIG. 3) of the server 305 (FIG. 3) by a reading module (2608 in FIG. 26), and are down laded to the client side. The downloaded data are temporarily saved and queued on the RAM 1304*b* of the computer 1301 of the client (310*a*, 310*b*, 310*c*, or 310*d*).

The correspondence between the data retrieved and downloaded by the reading module 2608, and the item selected and set by the item management module 2606 is processed by a graph display module 2609 shown in FIG. 26. This processing is executed based on the CPU 1303 of the client computer 1301. The graph display module 2609 inputs this processing result to the display controller 1309 shown in FIG. 13, which displays the graph display window 180 on the display device 1306 (S2006).

The view angle of the graph display window 180 can be changed. If the view angle is to be changed (S2007—YES), a view angle change module 2610 is started. The view angle is designated on the basis of an input from a view angle change instruction button 183 in FIG. 14. The view angle change module 2610 inputs the designated angle information to the graph display module 2609. The graph display module 2609 inputs the input new view angle information to the display controller 1309 shown in FIG. 13. The display controller 1309 switches the graph display window 180 on the basis of the input view angle information (S2013).

Furthermore, the set time axis can be changed after graph display. In such case, selection is made using an update date base graph display key 184 or delivery date base graph display key 185 in FIG. 14. When one of these keys is selected, the time management module 2607 is started, and passes date information as a reference date to the reading module 2608. Using the passed date information as a key, the reading module 2608 is started, and retrieves and downloads data corresponding to the newly set period from the databases (S2012 in FIG. 20, 400, 360, 370, 380, and 390 in FIG. 3) of the server 305 (FIG. 3) (S2005). The correspondence between the downloaded data and the item selected and set by the item management module 2606 is processed by the graph display module 2609 shown in FIG. 26. This processing is executed based on the CPU 1303 of the client computer 1301. The graph display module 2609 inputs this update processing result to the display controller 1309 in FIG. 13, and the time management module 2607 inputs date information associated with that change to the display controller 1309. The display controller 1309 displays the graph display window 180 associated with the updated date information on the display device 1306 (S2006).

In this display mode, the graph display module 2609 (FIG. 26) and display controller 1309 (FIG. 13) serve as a second display control means. The graph display module 2609 and display controller 1309 serve to display the results of orders received/placed associated with the selected managed item as the graph display window 180 (FIG. 14) on the display device 1306.

Furthermore, the time management module 2607, graph display module 2609 (FIG. 26), and display controller 1309 (FIG. 13) serve as a third display control means. The time management module 2607, graph display module 2609, and display controller 1309 serve to change the set time axis for the graph display window, and to display the results of orders received/placed associated with the selected managed item as the graph display window 180 on the display device 1306.

Also, the view angle change module 2610, graph display module 2609 (FIG. 26), and display controller 1309 (FIG. 13) serve as a fourth display control means. The view angle change module 2610, graph display module 2609, and display controller 1309 serve to display the results of orders received/placed associated with the selected managed item as the graph display window 180 on the display device 1306 on the basis of the view angle information.

Description of Graph Display Window

The graph display window 180 shown in FIG. 14 includes the managed "ACCEPTANCE", "ORDERS DETERMINED", "DIVIDED ORDERS", and "ORDER MODIFIED". The x-axis represents the date, the y-axis the managed item, and the z-axis the number of orders indicating the results of orders received/placed. The default format of the graph is a bird-view graph defined by these three axes, but its view angle can be changed based on an input from the view angle change instruction button 183. As examples upon changing the display angle of the graph, FIG. 15 shows the relationship between the managed items (y-axis) and the number of orders indicating the results of orders received/placed (z-axis), and FIG. 16 the relationship between the dates (x-axis) and the number of orders (z-axis).

Figure 15:
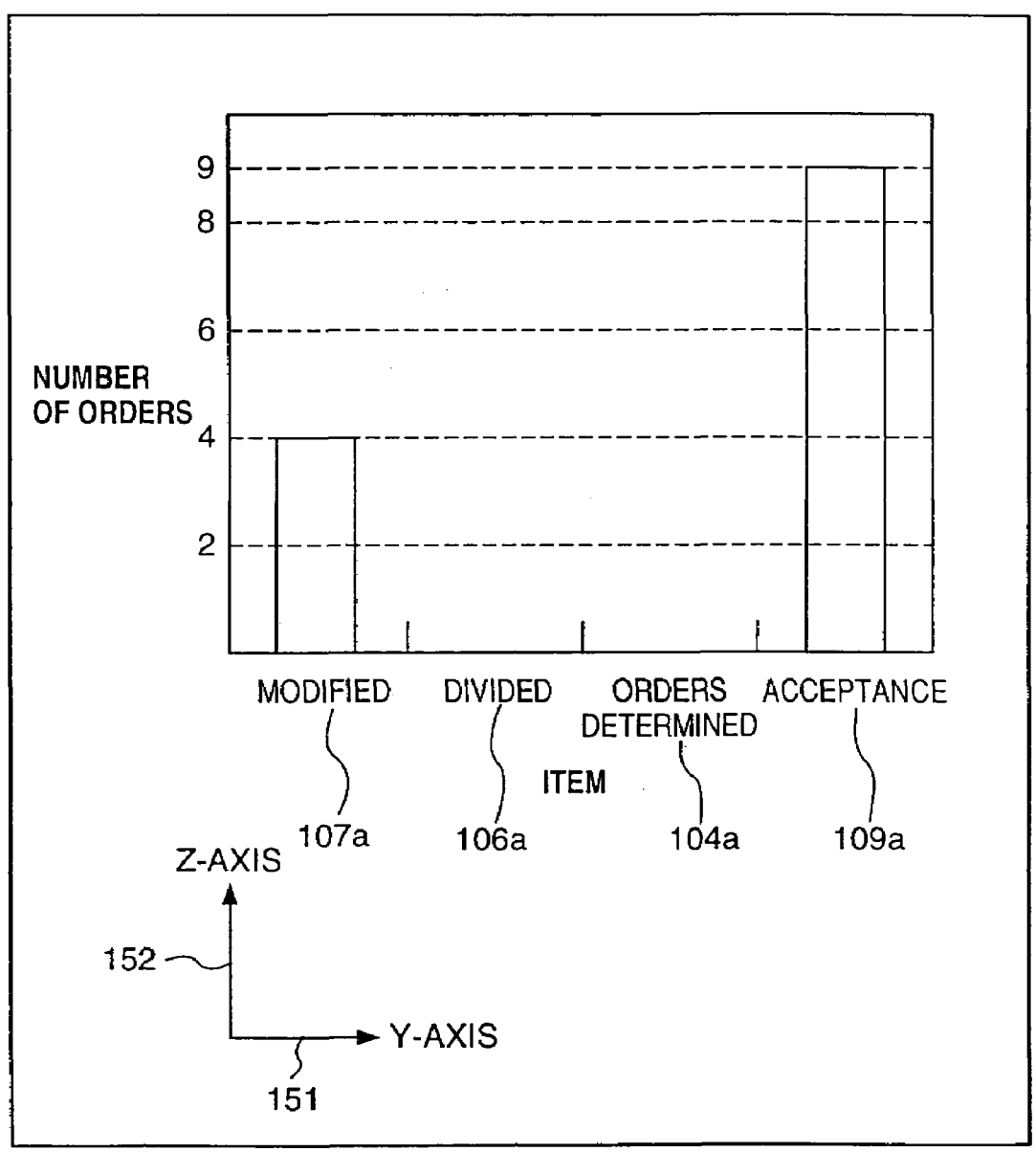
FIG. 15 shows the graph display window when the display angle of the graph display has changed.

As the number of orders in FIG. 15, the sum of the numbers of data during the objective period (from 7/4 to 7/10 in the example of the graph display window in FIG. 14) is displayed. For example, if "ACCEPTANCE" is taken as an example, the sum=9 of the numbers of data for five days (7/4: 1, 7/7: 4, 7/8: 1, 7/9: 1, and 7/10: 2) is displayed.

Figure 16:
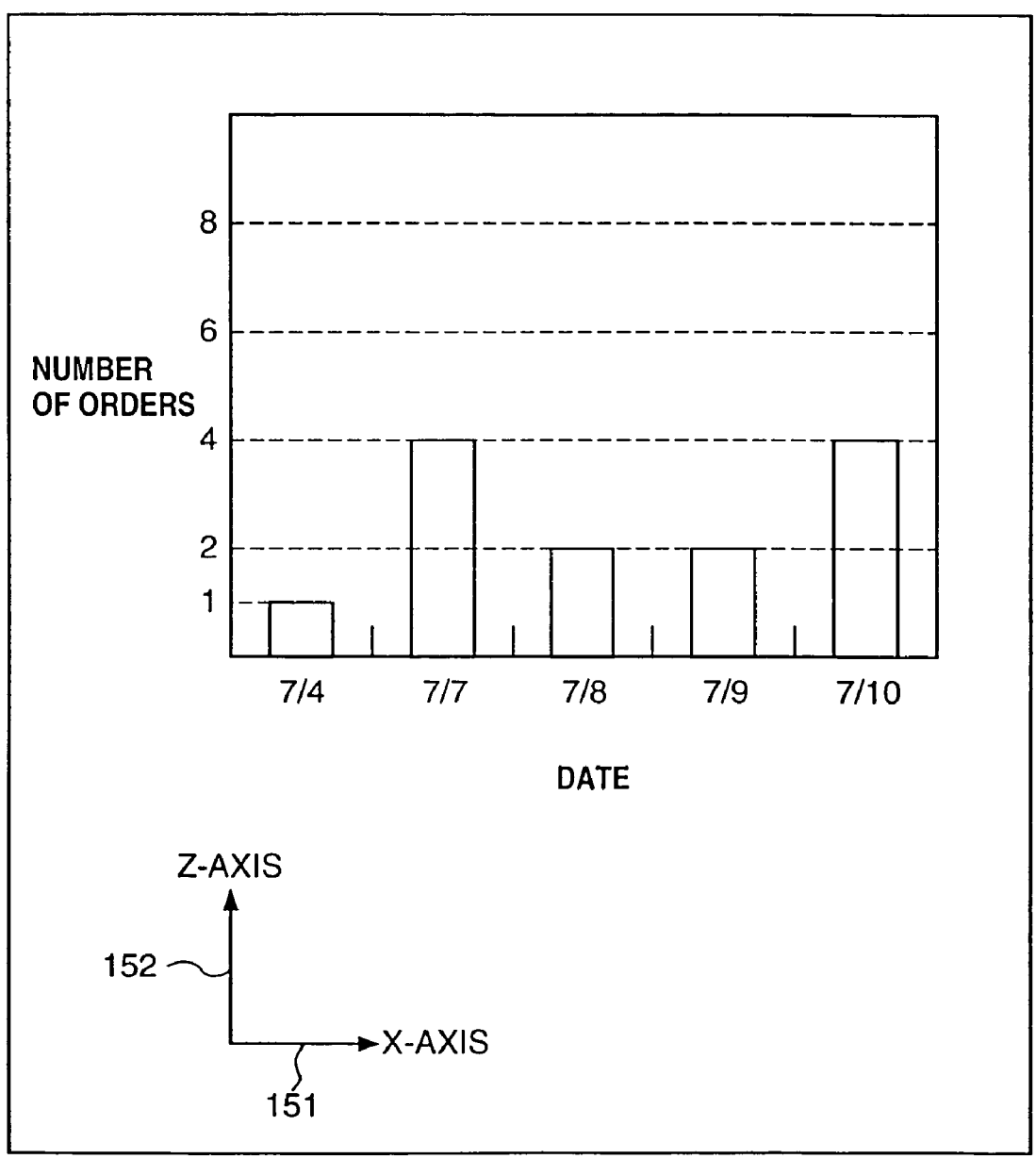
FIG. 16 shows the graph display window when the display angle of the graph display has changed.

As the number of orders in FIG. 16, the numbers of data of "ACCEPTANCE", "ORDERS DETERMINED", "DIVIDED ORDERS", and "ORDER MODIFIED" are summed up with reference to a given date. For example, if 7/10 is taken as an example, the sum=4 of the numbers of data of 2 of "ACCEPTANCE", 0 of "ORDERS DETERMINED", 0 of "DIVIDED ORDERS", and 2 of "ORDERS MODIFIED" is displayed.

Description of Date (X-Axis)

The x-axis of the graph display window 180 indicates the initial date of reckoning and period (days). As the initial display date of reckoning and period, a specific number of days may be set in addition to those based on "(five days from) reference date" as the default value, "last update date of data (data update date)", and "delivery date of parts".

Figure 20:
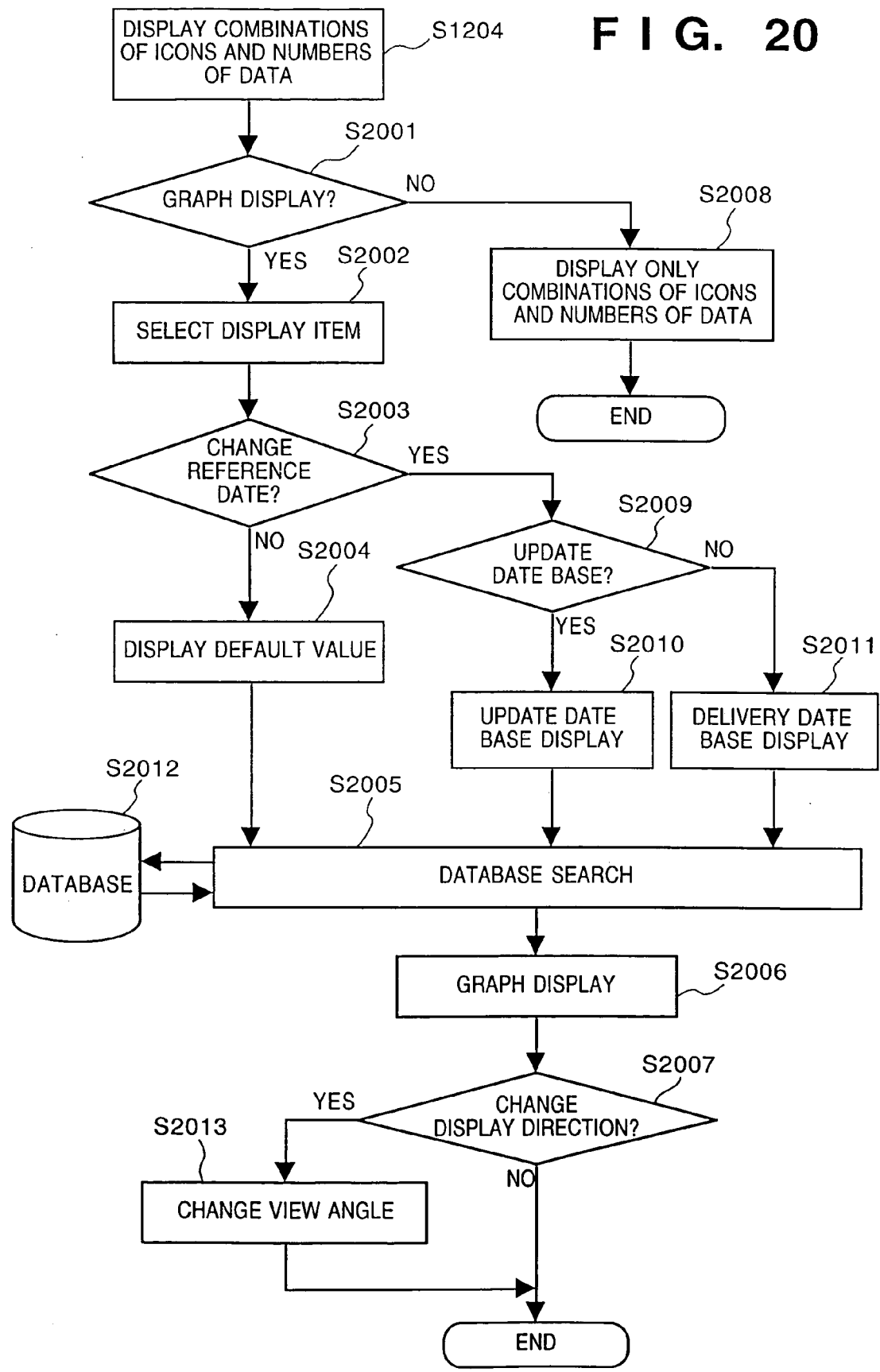
FIG. 20 is a flow chart for explaining graph display processing.

Such initial display date of reckoning and period can be set by inputting them to an input column (not shown) on the display device 1306 from the input device 1307 such as a keyboard or the like. The reading module 2608 searches the databases of the server 305 on the basis determined by the set number of days, downloads data to the client side, and temporarily saves the data on the RAM 1304b. The correspondence between the data retrieved and downloaded by the reading module 2608, and the items selected and set by the item management module 2606 is processed by the graph display module 2609 shown in FIG. 26. This processing is executed based on the CPU 1303 of the client computer 1301. The graph display module 2609 inputs this processing result to the display controller 1309 in FIG. 13, which displays the graph display window 180 on the display device 1306 (S2006: FIG. 20).

The graph display window 180 corresponds to a case wherein the initial display date of reckoning is 7/10, and the number of days is 5. In the graph display window 180, since 7/5 and 7/6 in 1997 respectively correspond to Saturday and Sunday, they are excluded from the display window, but may be included in the display window depending on the setups of the graph display module 2609. Furthermore, this system has built in a calendar effective for a given company, that is effective in units of factories, or the like, and can easily reflect holidays set in such calendar. Ordinarily, the system calendar and system clock managed by the OS 1302 of the computer 1301 (FIG. 13) are referred to.

The y-axis ("ACCEPTANCE" 109a, "ORDERS DETERMINED" 104a, "DIVIDED ORDERS" 106a, and "ORDERS MODIFIED" 107a) of the graph display window 180 in FIG. 14 indicates items selected from the managed item display window 170. All the managed items can be displayed, or important items alone can be selectively displayed.

Number of Orders (Z-Axis)

The z-axis of the graph display window 180 indicates the numbers of processed data in units of days in correspondence with the managed items. For example, if item "ACCEPTANCE" is selected and the objective dates are five days, i.e., 7/4, 7, 8, 9, and 10, the number of orders on 7/4 is 1, that on 7/7 is 4, that on 7/8 is 1, that on 7/9 is 1, and that on 7/10 is 2.

Addition for summing up the numbers of data in units of days is often required depending on the display modes shown in FIGS. 15 and 16, and is implemented by the graph display module 2609.

FIG. 15 shows the sum of the numbers of data for five days of the respective items ("ACCEPTANCE" 109a, "ORDERS DETERMINED" 104a, "DIVIDED ORDERS" 106a, and "ORDERS MODIFIED" 107a). An abscissa 151 plots the item, and an ordinate 152 plots the number of orders. For example, in case of "ACCEPTANCE" 109a, the number of orders is 9 as the sum total of the numbers of data of 1 on 7/4, 4 on 7/7, 1 on 7/8, 1 on 7/9, and 2 on 7/10.

FIG. 16 shows the sum of the numbers of data of "ACCEPTANCE" 109a, "ORDERS DETERMINED" 104a, "DIVIDED ORDERS" 106a, and "ORDERS MODIFIED" 107a with reference to days. An abscissa 150 plots the day, and an ordinate 152 plots the number of orders. Taking 7/7 as an example, the number of orders of 4 as the sum total of the numbers of data of 4 of "ACCEPTANCE" 109a, 0 of "ORDERS DETERMINED" 104a, 0 of "DIVIDED ORDERS" 106a, and 0 of "ORDERS MODIFIED" 107a in FIG. 14, is displayed.

Change Set Display Reference Date

The set display reference date can be changed by selecting one of the update date base graph display key 184 and delivery date base graph display key 185. "Update date base" means a display that uses, as the initial display date of reckoning, the date when data were updated to the latest ones downloaded from the databases (400, 360, 370, 380, and 390) of the server 305, and "delivery date base" means a display using data obtained by retrieving those of ordered articles, the expected acceptance date (delivery date) of which matches the date to be displayed.

For example, a case will be examined below wherein the graph display window 180 in FIG. 14 is a delivery date base display. There are two orders whose specifications have been modified on 7/10. Normally, ordered articles must be accepted before the delivery date, and two ordered articles with the status of "ORDERS MODIFIED" are delayed in scheduling. In the delivery date base display, a normal order received/placed processing result must have data only in the item "ACCEPTANCE", and if the columns of other items include data, they indicate an abnormality, i.e., a delay in scheduling. Hence, abnormal value management of the shop can be visually observed.

Figure 17:
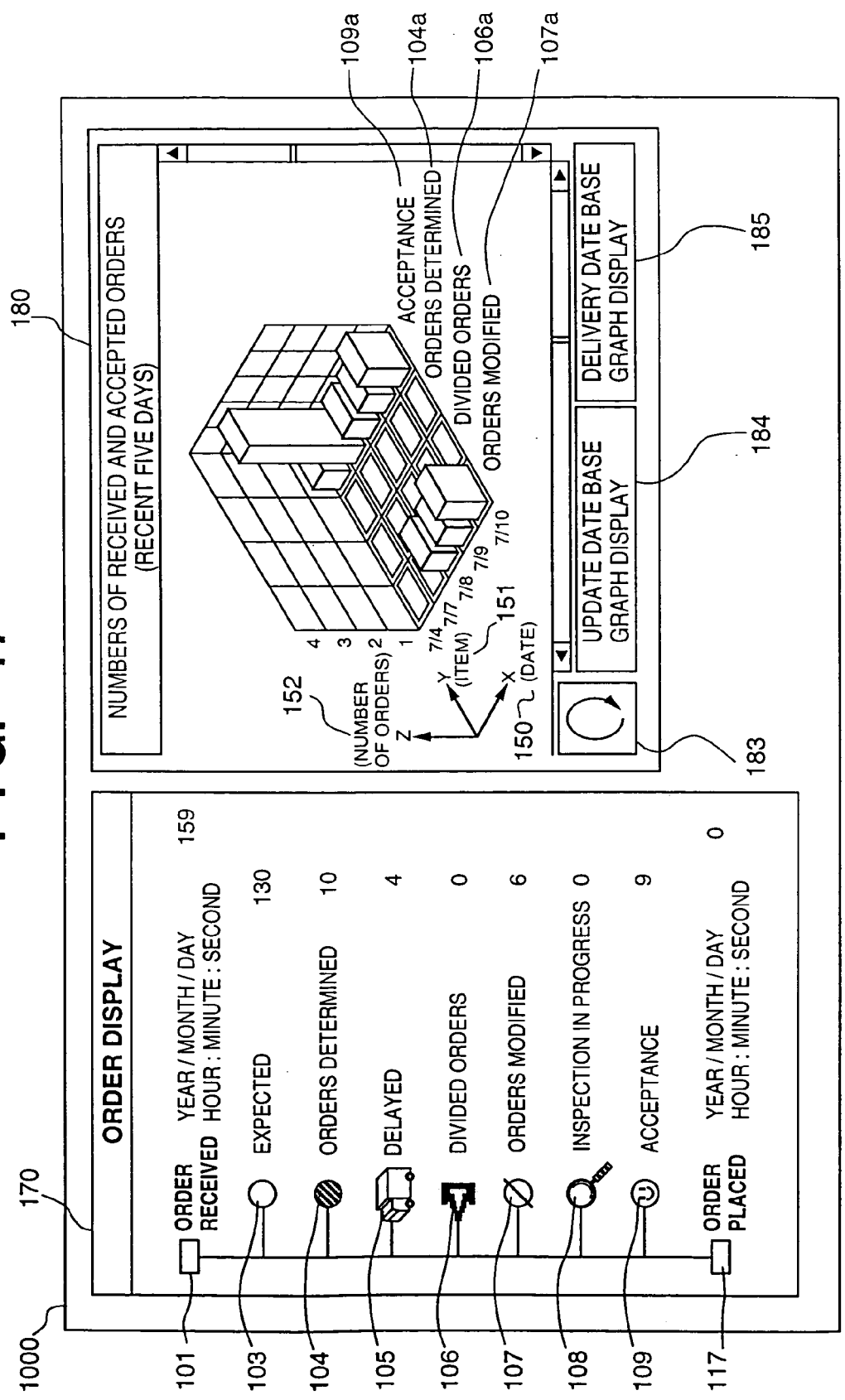
FIG. 17 shows an order received management screen including the managed item and graph display windows.
Figure 18:
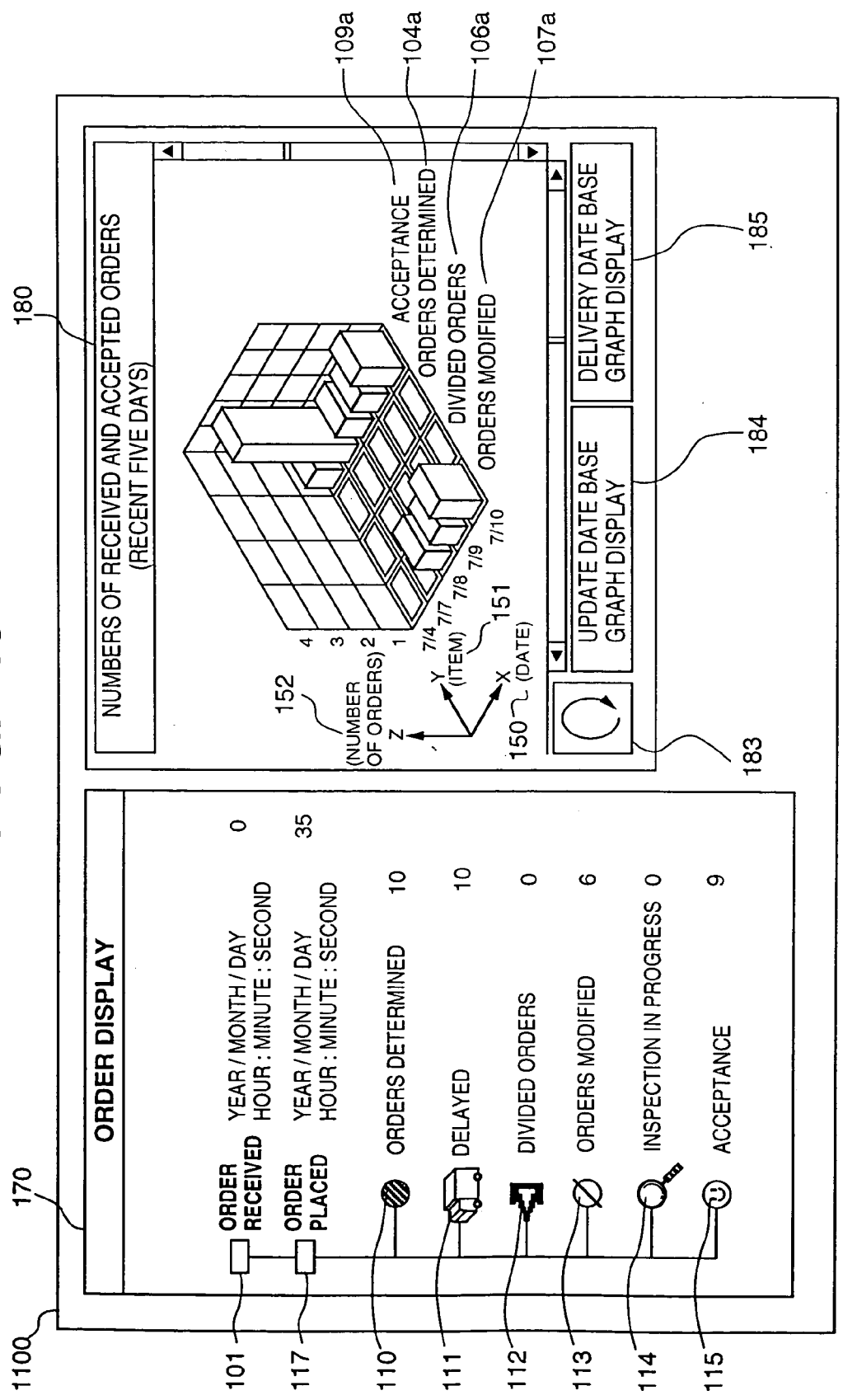
FIG. 18 shows an order placed management screen including the managed item and graph display windows.

FIGS. 14, 17, and 18 show combination displays of the managed item and graph display windows. The managed item display window 170 in FIG. 14 displays management of both orders received and orders placed, FIG. 17 is a case of orders received alone (no orders placed), and FIG. 18 is a case of orders placed alone (no orders received). As has been described in the first display mode, there are three managed item display modes depending on the order received and order placed patterns, i.e., (a) both orders received and orders placed (FIG. 1), (b) orders received alone (FIG. 8), and (c) orders placed alone (FIG. 9), and the relationships corresponding to these modes are similarly displayed in the graph display window.

Percentage Delay Distribution Management

Figure 19:
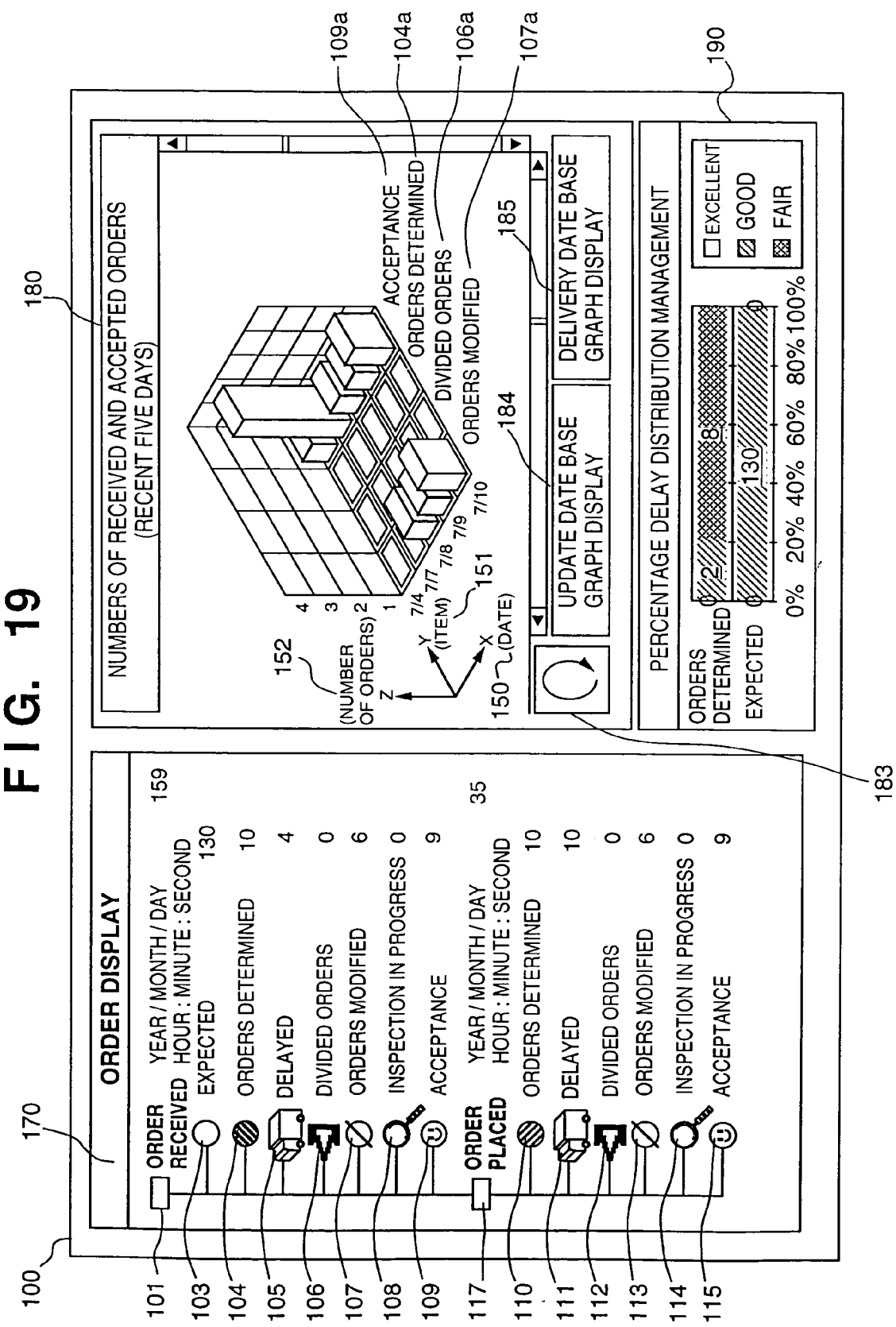
FIG. 19 shows an order received/placed management screen including managed item, graph, and percentage delay distribution management display windows.

"Percentage delay distribution management" means management of the lead times in units of managed items. FIG. 19 shows a screen display example that displays a percentage delay distribution management display window 190 for displaying the lead times that pertain to items "ORDERS DETERMINED" AND "EXPECTED" in addition to the aforementioned managed item display window 170 and graph display window 180.

The lead time of each item is displayed as a graph in one of three evaluation levels "excellent", "good", and "fair" on the basis of the reference lead time set on the system. With this percentage delay distribution management, the lead times in units of managed items can be analyzed in more detail. The percentage delay distribution management display window 190 is a display example associated with "ORDERS DETERMINED" and "EXPECTED". The item to be subjected to the percentage delay distribution management display can be selected from the managed item display window 170 as in the graph display window 180.

In the percentage delay distribution management display window 190, two orders in "ORDERS DETERMINED" are "good" and eight orders are "fair", and 130 orders in "EXPECTED" are "good". The percentage delay distribution management is processed by a percentage delay distribution management module 2611 shown in FIG. 26, and its processing result is input to the display controller 1309 shown in FIG. 13, which displays the percentage delay distribution management display window 190 on the display device 1306. Selection of the managed items to be subjected to the percentage delay distribution management display is processed by the item management module 2606 as in item selection for the graph display window 180.

When the relationship between the managed items for managing orders received/placed and data that represents the results of orders received/placed is visually observed as a graph, versatile analysis of, e.g., transition of order received/placed processing in units of days comparison in units of managed items, and the like can be made, and careful order received/placed management can be performed.

More specifically, the operator can be informed of an abnormal condition such as a delay in scheduling in real time, and need not search numerical value data (model numbers, quantities, delivery dates, and the like) upon every confirmation, thus preventing confirmation errors by the operator.

Furthermore, since information associated with orders received and orders placed required for parts management can be selectively registered in advance, and the analysis result can be visually displayed, the operator need not make any operations required for individual data search and analysis, unlike the prior art.

[Third Display Mode]

(Combination of Managed Item and Table Format Display Windows)

A table format display will be described below with reference to the flow chart in FIGS. 25A, B.

Combinations of icons and numbers of data are displayed as a default screen (FIGS. 1, 8, and 9, S1204: FIG. 12), and if a table format display is not made (S2501—NO), only combinations of icons and numbers of data corresponding to the managed items are displayed on the display device 1306 of the client computer (S2516). In this case, the managed item display window 170 shown in FIG. 1, 8, or 9 is displayed depending on the order received/placed pattern.

If the table format display is made (S2501—YES), an item to be displayed in a table format is selected from the managed item display window 170 (FIG. 1, 8, or 9) (S2502). The item is selected by inputting each item of the managed item display window 170 from the input device 1307 such as a mouse, keyboard, trackball, or the like. In this case, the items that can be selected are either all the icons (items) (S2502—YES) or one icon (item) (S2502—NO). The selection input of an item to be displayed in the table format is processed by the item management module 2606 shown in FIG. 26. When the managed item display window 170 and table format display window 210 are displayed on a single screen, the correspondence among items can be clarified, and comparison in units of items can be easily made.

The item management module 2606 manages an item or items selected for the table format display in addition to the item management for the aforementioned graph display. The items that can be selected for the table format display are either all the items or one item. For example, if the total number of items is 13, selection across two items is not allowed. Such inhibiting processing is used in accordance with the actual operation form of the shop to prevent an identical ordered article from being simultaneously registered and displayed across a plurality of managed items. However, when one item is initially selected in the table format display window 210, an item (icon) before or after the selected item may be required to be referred to later. In such a case, an individual item may be designated upon next selection. Such additional request is processed by an additional selection module 2616.

Detailed data that represent the results of orders received/placed of the selected items (S2502—YES, S2504 or S2503) are retrieved from the databases (S2515 in FIG. 25A, 400, 360, 370, 380, and 390 in FIG. 3) of the server 305 (FIG. 3) by the reading module (2608 in FIG. 26), and are downloaded to the client side (S2504, S2505). The downloaded data are temporarily saved and queued on the RAM 1304b of the computer 1301 of the client side (310a, 310b, 310c, or 310d).

The correspondence between the data retrieved and downloaded by the reading module 2608 and the items selected by the item management module 2606 is processed by a table format display module 2612 shown in FIG. 26. This processing is executed based on the CPU 1303 of the computer 1301. The table format display module 2612 inputs this processing result to the display controller 1309 shown in FIG. 13, which displays the table format display window 210 on the display device 1306 (S2506, S2507).

Figure 21:
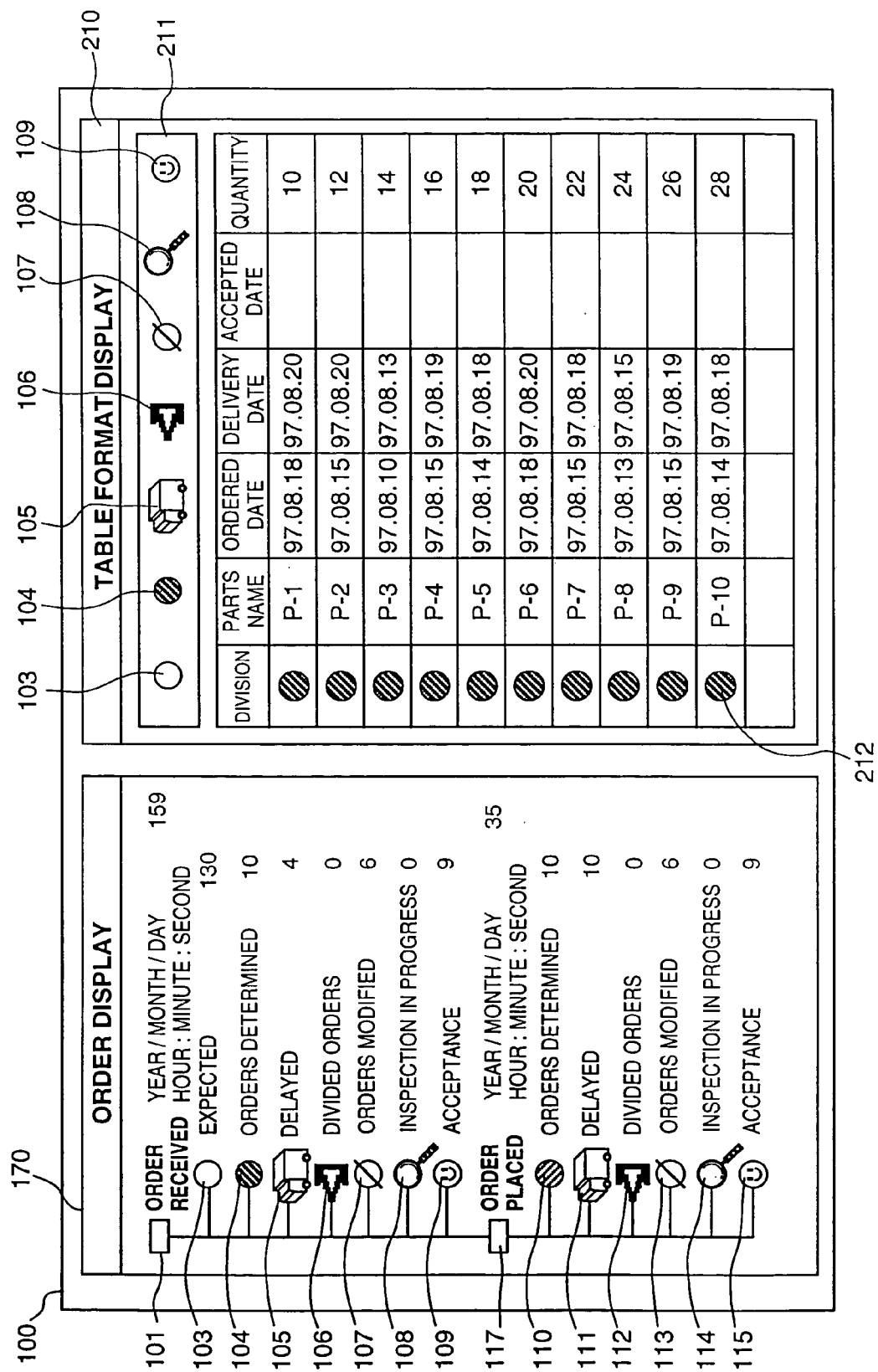
FIG. 21 shows an order received/placed management screen including the managed item and table format display windows.

The table format display module 2612 displays the same icons as those of the items selected by the item management module 2606 in the table format display window 210 (212 in FIG. 21). The correspondence between the managed item display window 170 and table format display window 210 can be easily determined by looking at an icon display window 211 (FIG. 21). The display position and size of the displayed table format display window 210 can be changed by the display device 1306 of the client computer.

When the table format display window is to be moved (S2508—YES, S2518—YES), the outer edge portion of the table format display window 210 is selected by the input device 1307 such as a mouse, trackball, or the like, and is aligned on the screen by the input device 1307 (S2519). Alignment is implemented by a position varying module 2613 shown in FIG. 26. The display coordinate position after alignment is passed from the position varying module 2613 to the table format display module 2612. The table format display module 2612 inputs the newly designated position information to the display controller 1309. The display controller 1309 displays the table format display window 210 on the display device 1306=on the basis of the input position information.

The table format display window 210 that has been moved may overlap, e.g., the managed item display window 170. When the managed item display window 170 and table format display window 210 interfere with each other (displayed contents overlap each other) on the display device 1306, an overwriting module 2615 shown in FIG. 26 is started to issue an overwrite processing display command to the table format display module 2612 or display control module 2604. When the two windows interfere with each other, which window is displayed in front of or is hidden behind the other is determined by inputting the window to be displayed (e.g., the managed item display window 170 or table format display window 210 in FIG. 21) from the input device 1307 such as a mouse, keyboard, trackball, or the like. More specifically, the outer edge portion of the table format display window 210 is clicked by the mouse to select the window 210. The selection input result of the overwriting module 2615 is input to the table format display module 2612 or display control module 2604, and one of these modules inputs that result to the display controller 1309. The display controller 1309 displays the selected window to be displayed in front of the other (or the window to be hidden behind the other) on the display device 1306.

When the size of the window is to be changed (S2520—YES), the outer edge portion of the table format display window 210 is selected by the input device 1307 such as a mouse, trackball, or the like, and the size is designated and changed on the screen by the input device 1307 (S2521). The size change is implemented by a size varying module 2614 shown in FIG. 26. The changed size information is passed from the size varying module 2614 to the table format display module 2612. The table format display module 2612 inputs the newly designated size information to the display controller 1309. The display controller 1309 displays the table format display window 210 on the display device 1309 on the basis of the input size information.

When one item is initially selected from the managed item display window 170 (S2502—NO, 2503), another item can be additionally selected from the icon display window 211 of the table format display window 210. If an item is additionally selected (S2509—YES, S2510), the additional selection module (2616 in FIG. 26) is started. The additional selection module 2616 retrieves order received/placed data of the item (icon) selected from the icon display window 211 from the databases (400, 360, 370, 380, and 390) of the server 305 (FIG. 3), and downloads them to the client side (310a, 310b, 310c, and 310d) (2511). The downloaded data are temporarily saved and queued on the RAM 1304b of the computer 1301.

After saving, the additional selection module 2616 passes the queued saved data to the table format display module 2612. The table format display module 2612 inputs the data as added table format information to the display controller 1309. The display controller 1309 updates the contents of the table format display window and displays the updated contents of the window on the display device 1306 (FIG. 22).

Figure 22:
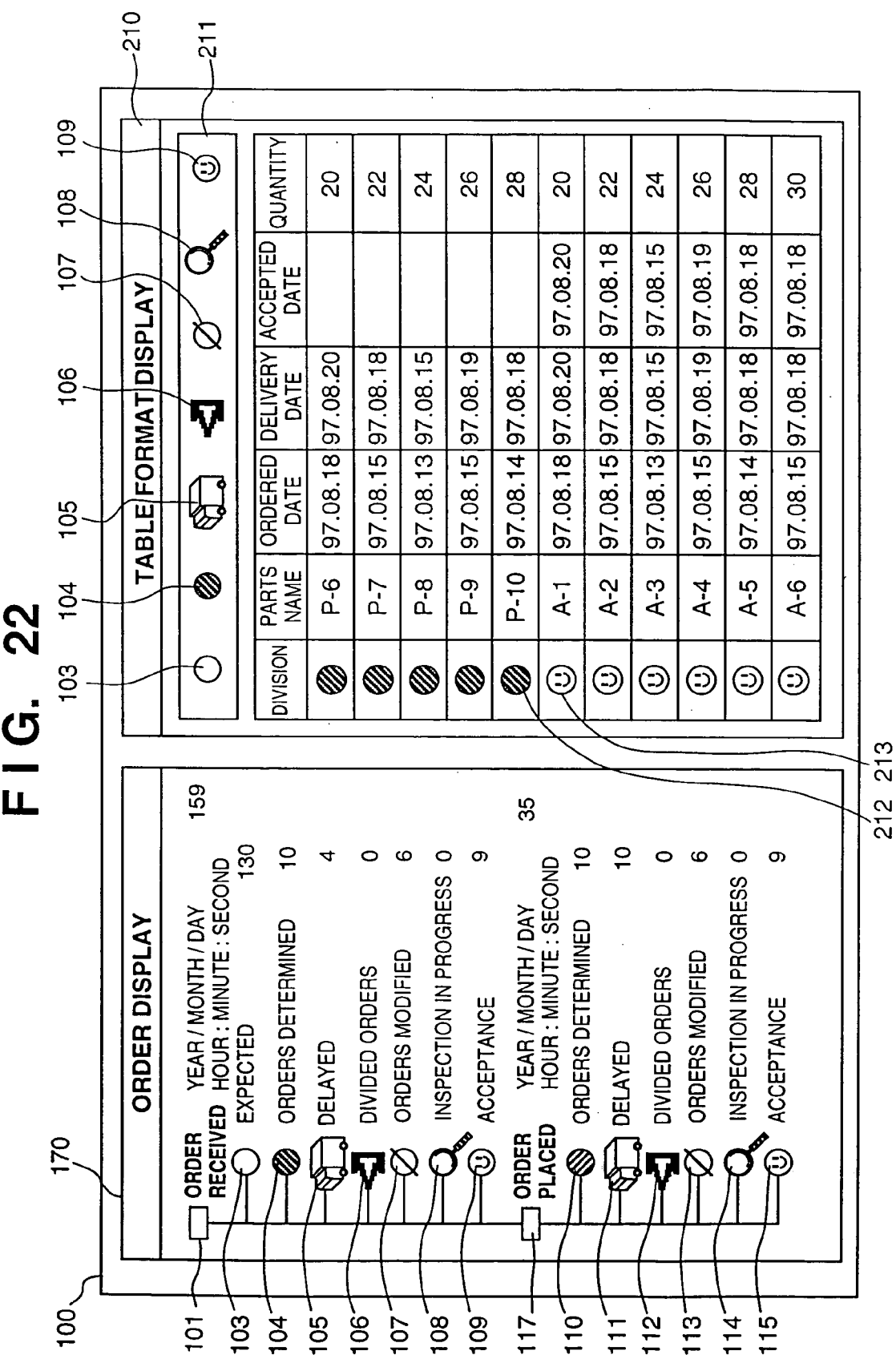
FIG. 22 shows an order received/placed management screen after items to be displayed in the table format display window are added.

FIG. 22 shows a display example obtained when an item of the table format display window is additionally selected. An icon 212 displayed in the column of division in the table indicates an item designated from the managed item display window 170 by the first selection, and an icon 213 indicates an item designated from the icon display window 211 by the additional selection.

The data line-up order of the table format display window 210 is the order managed items are selected in case of FIG. 22, but the items may be sorted (to change the line-up order). Sorting conditions may be selected to change the sequential order in units of icons, to classify contents in units of specific dates, and so forth, and sorting is executed by inputting a command to a predetermined input column (not shown) displayed on the display device 1306. Upon inputting the sorting execution command, the table format display module 2612 sorts data and inputs the sorting result to the display controller 1309. The display controller 1309 displays the result on the display device 1306.

In this display mode, the table format display module 2612 (FIG. 26) and display controller 1309 (FIG. 13) serve as a fifth display control means. The table format display module 2612 and display controller 1309 serve to display the order received/placed results associated with the selected managed item on the display device 1306 as the table format display window 210 (FIG. 21). Furthermore, the fifth display control means has a function of changing the display position and size of the table format display window 210 to be displayed on the display device 1306, and executing the overwrite processing (for selecting which of the table format display window 210 and managed item display window 170 is to be displayed on the top of the screen if they overlap each other) in combination with the position varying module 2613, size varying module 2614, and overwriting mule 2615.

The reading module (2608 in FIG. 26) serves as a first reading means. The reading module 2608 serves to retrieve detailed data indicating the order received/placed results of the selected item or items (one or all the items) from the databases (400, 360, 370, 380, and 390 in FIG. 3) of the server 305 (FIG. 3) and download them to the client side.

Furthermore, the additional selection module (2616 in FIG. 26) serves as a second reading means. The additional selection module 2616 serves to retrieve order received/placed data of the item (icon) additionally selected from the icon display window 211 of the table format display window 210 from the databases (400, 360, 370, 380, and 390) of the server 305 (FIG. 3) and download them to the client side (1311).

Description of Table Format Display Window

The table format display window 210 shown in FIG. 21 corresponds to a display example when "ORDERS DETERMINED" 104 associated with orders received is selected. The same icon as that of the selected managed item ("●" in case of "ORDERS DETERMINED") is displayed in the column of division on the table format display window. By looking at the icons on the screen, the correspondence among items can be clarified, and comparison in units of items can be easily made. When one item is selected, it is possible to add another item to be displayed on the table format display window from an additional selection column (icon display window) 211. The items on the icon display window 211 match those on the managed item display window 170, and are indicated by common icons. An item is selected by the input device 1307 such as a mouse or the like. The additional selection is implemented by the aforementioned additional selection module 2616 (FIG. 26).

One or all the items to be displayed on the table format display window can be selected from the managed item display window 170, and such limitation on selection is imposed by the operation form of the shop that performs parts management. Normally, a specific managed item is referred to, and when an item before or after the specific item need be consequently referred to, the item to be referred to is added. Such search method is reflected in the system.

When viewed from the operator side, the system operates based directly on one's working pattern, thus improving the work efficiency. More specifically, every time the operator checks numerical value data (model numbers, quantities, delivery dates, and the like) filled in a table format sheet, easy checking is allowed, and errors of the operator can be eliminated. Furthermore, the work time required for data search can be shortened.

When viewed from the system side, accesses to the databases can be minimized, and high hardware resource efficiency can be maintained.

FIG. 22 shows a screen display when the item "ACCEPTANCE" 109 is added and displayed. For the additionally selected item, an icon is similarly displayed as in the first selection ("ORDERS DETERMINED" 104 in this case). When a plurality of items are displayed, checking by means of icons is very effective.

The data line-up order of the table format display window 210 corresponds to the order items selected in case of FIG. 22, but the items may be shortened (to change the line-up order). Since sorting has already been described above, a description thereof will be omitted.

In the table format display window, items can be simultaneously displayed in addition to individual (one item) selection of the item mentioned above. When the icon 101 associated with orders received in the managed item display window 170 shown in FIG. 21 is selected, all the pieces of detailed information ("EXPECTED" 103, "ORDERS DETERMINED" 104, "DELAYED" 105, "DIVIDED ORDERS" 106, "ORDERS MODIFIED" 107, "INSPECTION IN PROGRESS" 108, and "ACCEPTANCE" 109) associated with orders received are displayed in the table format.

Similarly, when the icon 117 associated with orders placed is selected from the window 170, all the pieces of detailed information associated with orders placed are displayed in a table format. The simultaneous table format display processing is implemented by the table format display module 2612.

The display position of the table format display window on the screen can be changed while the window is selected by the input device 1307 such as a mouse or the like and the input device is kept pressed (with the mouse button held down). The table format display window 210 can be displayed to overlap the managed item display window 170. More specifically, the window 210 can be displayed in front of or behind the window 170.

The display size of the table format display window on the screen can be changed by using a mouse while the window is selected by the input device 1307 such as a mouse or the like and the input device is kept pressed (with the mouse button held down). Also, the table format display window can be minimized as an icon. Such processing is implemented by the position varying module 2613, overwriting module 2615, and size varying module 2614 mentioned above.

Figure 27:
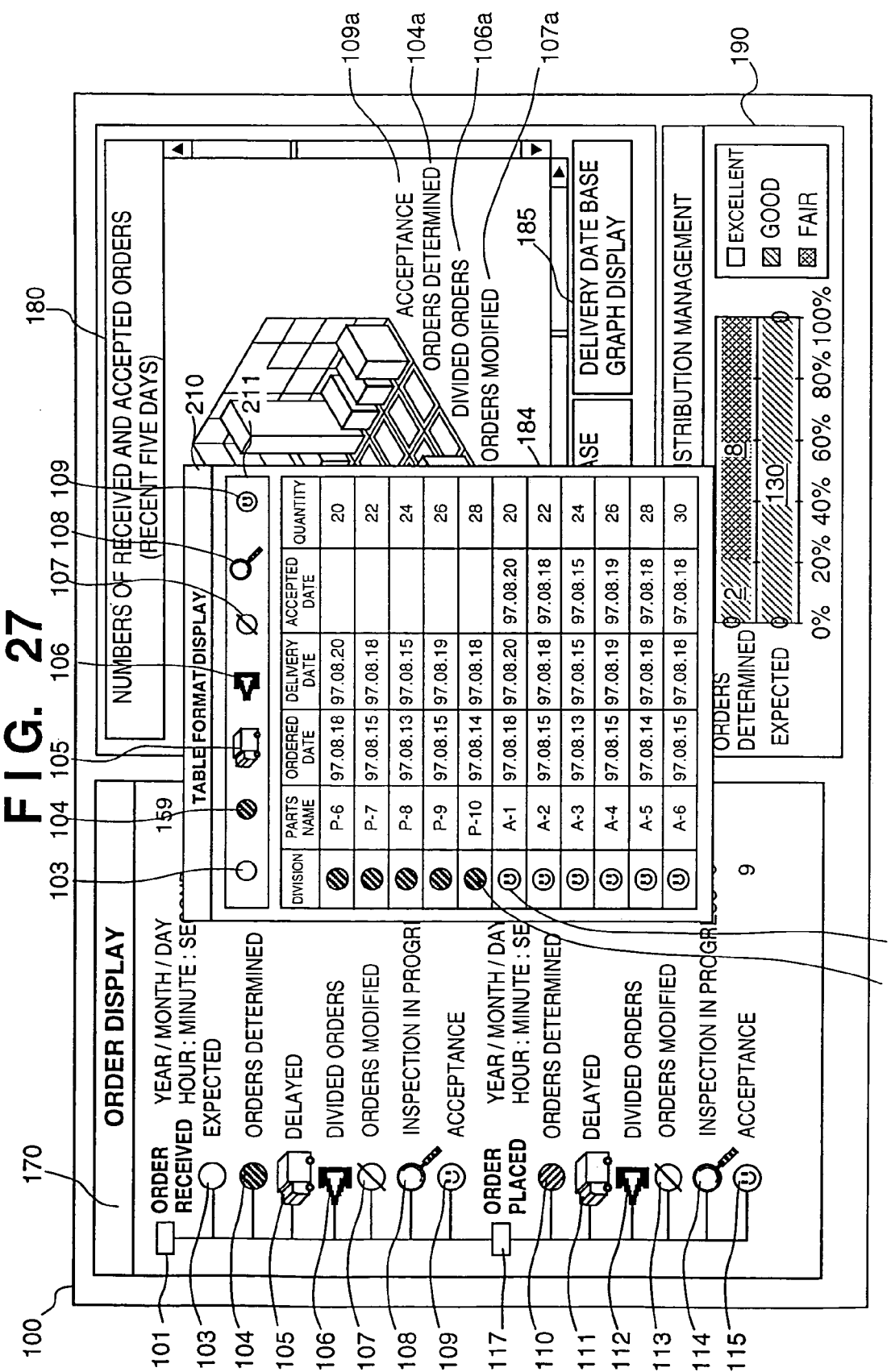
FIG. 27 shows an order received/placed management screen including the managed item, graph, and table format display windows.

The overwrite processing of the table format display window 210 is available when not only the managed item display window 170 but also the graph display window 180 are displayed. For example, the table format display window can be selected in step S1210 in FIG. 12 while the graph display window is being displayed. In such case, the table format display window 210 is displayed frontmost on the screen, as shown in FIG. 27. The display control (e.g., move, change in size, minimize, and so on) of the table format display window 210 is not limited even when the graph display window 180 is displayed. The same applies to the display control of each of the managed item display window 170 and graph display window 180, and such display control is not limited by other display windows.

Figure 23:
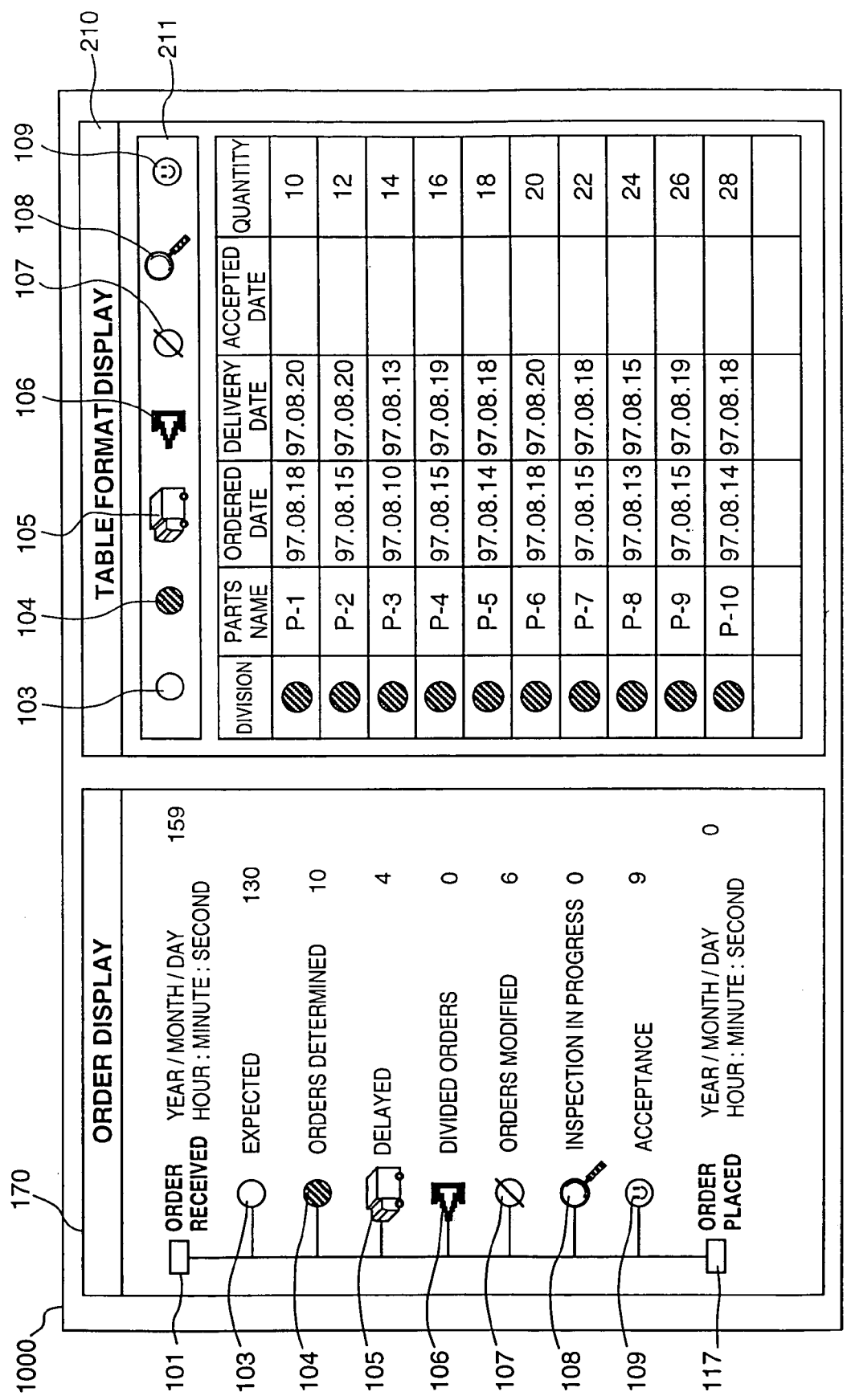
FIG. 23 shows an order received management screen including the managed item and table format display windows.
Figure 24:
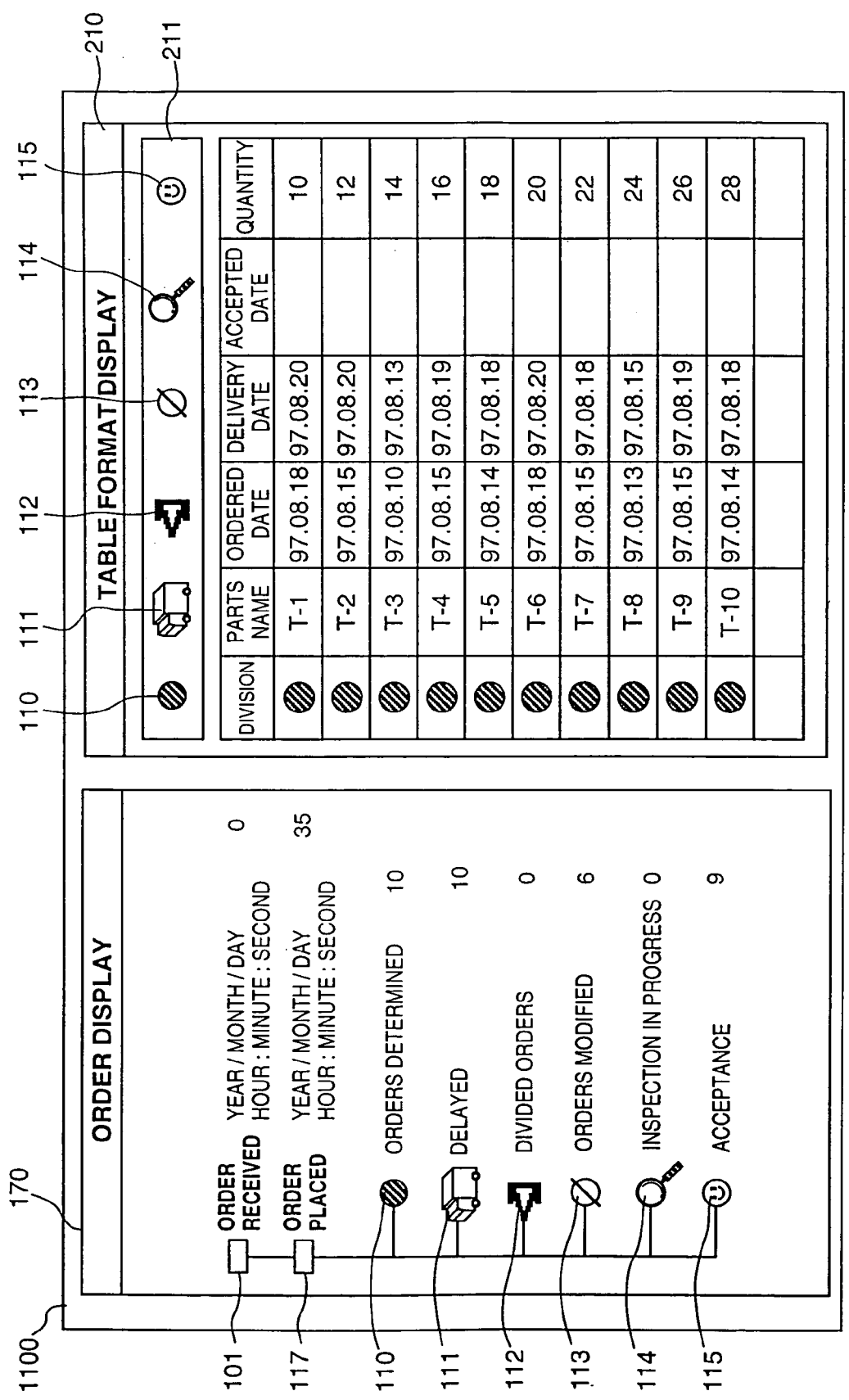
FIG. 24 shows an order placed management screen including the managed item and table format display windows.

FIGS. 23 and 24 respectively show a case wherein the managed item display window 170 includes items for orders received alone (no orders placed), and a case wherein the window 170 includes items for orders placed alone (no orders received). As has been described in the first display mode, there are three managed item display modes depending on the order received and order placed patterns, i.e., (a) both orders received and orders placed (FIG. 1), (b) orders received alone (FIG. 8), and (c) orders placed alone (FIG. 9), and the relationships corresponding to these modes are similarly displayed in the table format display window.

Management that manages the overall status by combinations of icons (managed items) and numbers of data, and displays the detailed information of the selected item in the table format, can easily determine the correspondence between management indicating the processing status of the overall shop and detailed management in units of parts, thus allowing easy and accurate order received/placed management.

Since the item selection of the table format display window is organized for easy use, the correspondence between the management of the overall shops and management in units of parts can be smoothly determined, thus improving the work efficiency. Since the correspondence can be easily determined, confirmation errors of the operator can be eliminated, and the work time required for data search can be shortened.

Also, in the system, accesses to the databases can be minimized, and high hardware resource efficiency can be maintained.

Supply of Software

The parts management according to the present invention is also achieved by supplying a storage medium, which records a program code of a software program that can implement the functions of the above-mentioned display modes to a system apparatus, and reading out and executing the program code stored in the storage medium by a computer (or a CPU or MPU (microprocessing unit)) of the system or apparatus.

In this case, the program code itself read out from the storage medium implements the functions of the above-mentioned display modes, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned display modes may be realized not only by executing the readout program code by the computer but also by some or all of actual processing operations executed by an OS (operating system) running on the computer on the basis of an instruction of the program code.

Furthermore, the functions of the above-mentioned display modes may be realized by some or all of actual processing operations executed by a CPU or the like arranged in a function extension board or a function extension unit, which is inserted in or connected to the computer, after the program code read out from the storage medium is written in a memory of the extension board or unit.

Figure 25B:
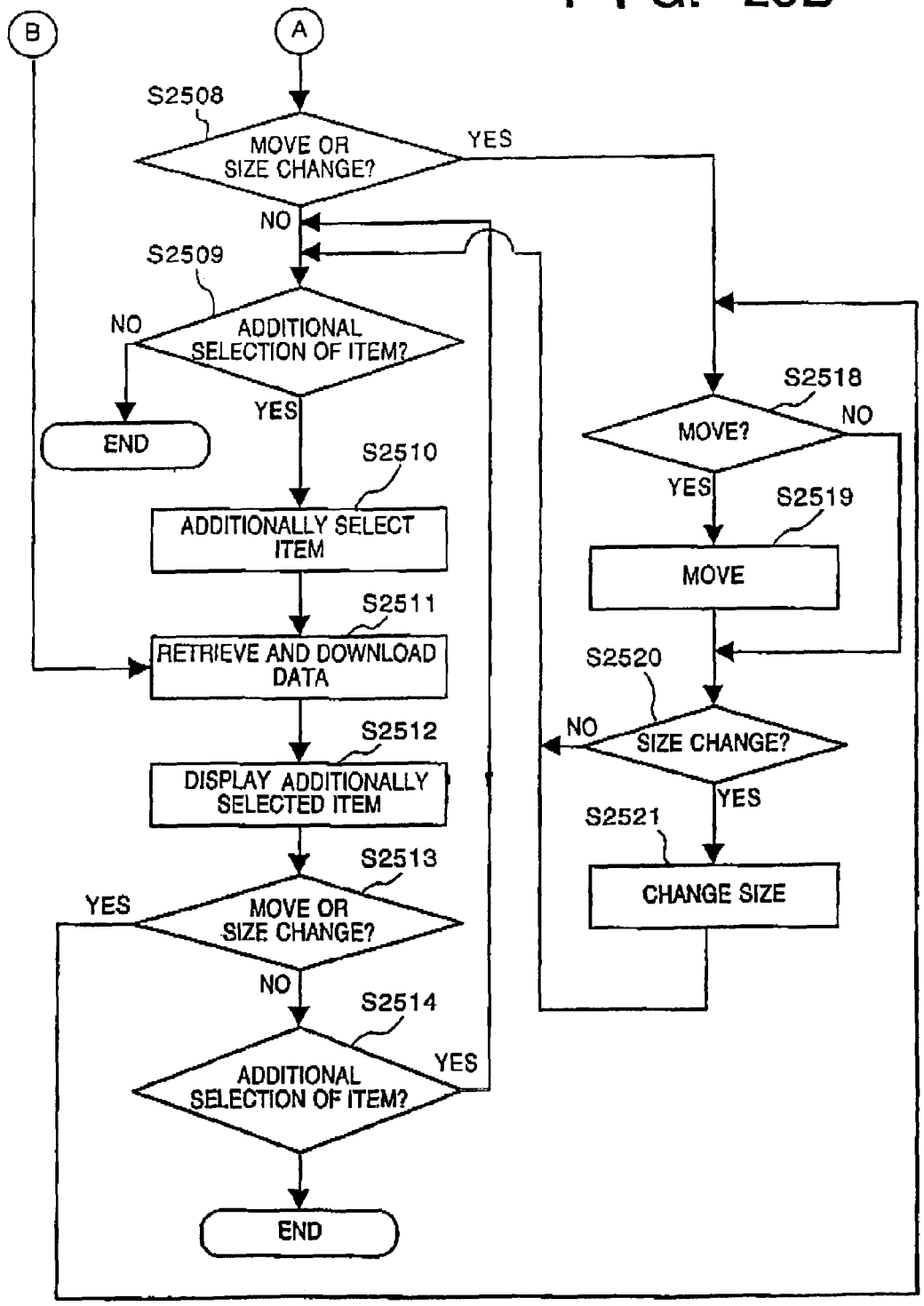
FIG. 25B is a flow chart for explaining table format display processing.

When the present invention is applied to the storage medium, the storage medium stores program codes corresponding to the above-mentioned flow charts (FIGS. 12, 20, and 25). In view of the functional arrangement of the program, modules shown in FIG. 26 are stored in the storage medium.

More specifically, the storage medium stores the data update module 2602 for downloading data indicating results of orders received/placed of parts from the server to a client to update data by the latest downloaded data, the icon management module 2603 for managing registration, change, and deletion of icons, the display control module 2604 for performing combination display processing of icons which identify orders received/placed, and the numbers of data indicating the order received/placed results, the shop order receipt/placement management module 2605 for managing the order received/placed relationship among shops, the item management module 2606 for managing items selected for the table format display, the time management module 2607 for managing times such as a reference date, period, and the like for the graph display, the reading module 2608 for retrieving data required for the table format display from the server databases and downloading the data to the client side, the graph display module 2609 for displaying the selected managed items and data set with the initial display date of reckoning as a graph, the view angle change module 2610 for changing the view angle of the displayed graph, the table format display module 2612 for performing data processing for the table format display, the position varying module 2613 for performing processing for changing the display position of the table format display window, the size varying module 2614 for performing size change processing of the table format display window, the overwriting module 2615 for performing overwriting processing when the managed item display window and table format display window interfere with each other, and the additional selection module 2616 for processing addition of an item in the table format display window.

The present invention is not limited to the above display modes and various changes and modifications can be made within the spirit and scope of the present invention. Therefore, to appraise the public of the scope of the present invention, the following claims are made.

What is claimed is:

1. A system for managing, orders received from a first shop and orders placed with a second shop comprising:
   communication means for communicating data indicating statuses of orders received, and orders placed; and
   display control means for controlling to display simultaneously a first combination of a first group of management items which indicate statuses of order process from order determined to acceptance and each number of the orders received corresponding to each of the statuses of the first group of management items, the first group of the management items displayed under a first icon which is for discriminating the first group of management items as the orders received, and a second combination of a second group of management items which indicate statuses of order process from order determined to acceptance and each number of the orders placed corresponding to each of the statuses of the second group of management items, the second group of the management items displayed under a second icon which is for discriminating the second group of management items as the orders placed, in the case where the orders received and the orders placed are existence,
   wherein said display control means displays simultaneously the first icon and the first combination as a pair, and displays simultaneously the second icon and the second combination as a second pair, in a case where the orders received and the orders placed are existence,
   wherein said display control means prohibits the displaying of the first combination except for the first icon, in a case where the orders received is not existence, and
   wherein said display control means prohibits the displaying of the second combination except for the second icon, in a case where the orders placed is not existence.

2. A method for managing, orders received from a first shop and orders placed with a second shop comprising:
   a communication step of communicating data indicating statuses of orders received, and orders placed; and
   a display control step of controlling to display simultaneously a first combination of a first group of management items which indicate the statuses of order process from order determined to acceptance and each number of the orders received corresponding to each of the statuses of the first group of management items, the first group of the management items displayed under a first icon which is for discriminating the first group of management items as the orders received, and a second combination of a second group of management items which indicate statuses of order process from order determined to acceptance and each number of the orders placed corresponding to each of the statuses of the second group of management items, the second group of the management items displayed under a second icon which is for discriminating the second group of management items as the orders placed, in a case where the orders received and the orders placed are existence, wherein said display control step displays simultaneously the first icon and the first combination as a pair, and displays simultaneously the second icon and the second combination as a second pair, in a case where the orders received and the orders placed are existence, wherein said display control step controls prohibits the displaying of the first combination except for the first icon, in a case where the orders received is not existence, and wherein said display control step prohibits the displaying of the second combination except for the second icon, in a case where the orders placed is not existence.

3. A storage medium storing program modules of a method executable on a computer for managing orders received from a first shop and orders placed with a second shop, wherein the program modules include:

a module for communicating data indicating statuses of orders received, and orders placed; and a display control module for controlling to display simultaneously a first combination of a first group of management items which indicate statuses of order process from order determined to acceptance and each number of the orders received corresponding to each of the statuses of the first group of management items, the first group of the management items displayed under a first icon which is for discriminating the first group of management items as the orders received, and a second combination of a second group of management items which indicate statuses of order process from order determined to acceptance and each number of the orders placed corresponding to each of the statuses of the second group of management items, the second group of the management items displayed under a second icon which is for discriminating the second group of management items as the orders placed, in the case where the orders received and the orders placed are existence, wherein said display control module displays simultaneously the first icon and the first combination as a pair, and displays simultaneously the second icon and the second combination as a second pair, in a case where the orders received and the orders placed are existence, wherein said display control module prohibits the displaying of the first combination except for the first icon, in a case where the orders received is not existence, and wherein said display control module prohibits the displaying of the second combination except for the second icon, in a case where the orders placed is not existence.

* * * * *

UNITED STATES PATENT AND TRADEMARK OFFICE
CERTIFICATE OF CORRECTION

| | |
|---|---|
| PATENT NO. | : 6,957,190 B1 |
| APPLICATION NO. | : 09/156311 |
| DATED | : October 18, 2005 |
| INVENTOR(S) | : Masahiko Sakayori et al. |

Page 1 of 1

It is certified that error appears in the above-identified patent and that said Letters Patent is hereby corrected as shown below:

Column 9, line 36, delete " that shops " and insert -- that "shops" --

Column 16, line 62, delete " FIG. 1 " and insert -- FIG. 11 --

Signed and Sealed this

Sixteenth Day of October, 2007

JON W. DUDAS
*Director of the United States Patent and Trademark Office*